(12) United States Patent
Thornton

(10) Patent No.: US 6,735,658 B1
(45) Date of Patent: May 11, 2004

(54) SYSTEM AND METHOD FOR COMBINING COMPUTER VIDEO AND REMOTE UNIVERSAL SERIAL BUS IN AN EXTENDED CABLE

(75) Inventor: Barry Thornton, Austin, TX (US)

(73) Assignee: ClearCube Technology, Inc., Austin, TX (US)

( * ) Notice: Subject to any disclaimer, the term of this patent is extended or adjusted under 35 U.S.C. 154(b) by 382 days.

(21) Appl. No.: 09/680,760

(22) Filed: Oct. 6, 2000

(51) Int. Cl.$^7$ ............................................. G06F 13/00
(52) U.S. Cl. ........................ 710/305; 710/2; 710/300
(58) Field of Search ..................... 710/100, 300–304, 710/305–315, 2, 62–74; 709/217–219

(56) References Cited

U.S. PATENT DOCUMENTS

| | | |
|---|---|---|
| 3,725,866 A | 4/1973 | Oldfield et al. |
| 4,484,306 A | 11/1984 | Kulczyckyj et al. |
| 4,688,246 A | 8/1987 | Eilers et al. |
| 4,885,718 A | 12/1989 | Asprey et al. |
| 5,150,243 A | 9/1992 | Suzuki |
| 5,257,390 A | 10/1993 | Asprey |
| 5,258,660 A | * 11/1993 | Nelson et al. ............... 327/141 |
| 5,268,676 A | 12/1993 | Asprey et al. |
| 5,337,025 A | * 8/1994 | Polhemus ................. 333/28 R |
| 5,337,413 A | 8/1994 | Lui et al. |
| 5,347,167 A | 9/1994 | Singh |
| 5,353,409 A | 10/1994 | Asprey et al. |
| 5,428,806 A | 6/1995 | Pocrass |
| 5,479,617 A | 12/1995 | Nei |
| 5,499,377 A | 3/1996 | Lee |
| 5,550,593 A | 8/1996 | Nakabayashi |
| 5,577,205 A | 11/1996 | Hwang et al. |
| 5,598,401 A | 1/1997 | Blackwell et al. |
| 5,623,304 A | 4/1997 | Ota et al. |
| 5,675,811 A | 10/1997 | Broedner et al. |
| 5,715,410 A | 2/1998 | Kim |
| 5,721,842 A | 2/1998 | Beasley et al. |
| 5,734,834 A | 3/1998 | Yoneyama |
| 5,801,689 A | 9/1998 | Huntsman |
| 5,802,281 A | 9/1998 | Clapp et al. |
| 5,831,608 A | 11/1998 | Janay et al. |
| 5,878,271 A | 3/1999 | Crump et al. |
| 5,884,096 A | 3/1999 | Beasley et al. |
| 5,926,172 A | 7/1999 | Hanley |
| 5,926,509 A | 7/1999 | Stewart et al. |
| 5,948,092 A | 9/1999 | Crump et al. |
| 5,966,056 A | 10/1999 | Thornton |

(List continued on next page.)

*Primary Examiner*—Sumati Lefowitz
(74) *Attorney, Agent, or Firm*—Meyertons Hood Kivlin Kowert & Goetzel, P.C.; Jeffrey C. Hood

(57) ABSTRACT

A system and method for operating a display device and one or more USB peripherals remotely from a host computer. The system may include a host computer, a display device, one or more USB compliant peripherals, a local extender operable to couple to the host computer system and a remote extender coupled to the local extender and to the display device and one or more USB peripherals. The local extender may be coupled to the remote extender through four twisted wire pairs which in one embodiment comprises a category 5 cable. The cable may be longer than the maximum length allowed by the USB specification. The host computer system may generate a video signal intended for the display device, as well as one or more peripheral signals intended for the one or more USB peripherals. The video signals may be received by the local extender from the host computer, converted to a form which is suitable for transmission over the cable, and transmitted to the second video converter which may then send the video signals to the display device. The local extender may receive the one or more peripheral signals from the host computer system over an internal computer bus, such as a PCI bus, convert the signals to a non-USB compliant protocol, such as Universal Serial Bus Extension (USBX) packets, and transmit the USBX packets to the remote extender over the cable. The video data may include RGB signals as well as HSync and VSync video synchronization signals.

43 Claims, 21 Drawing Sheets

U.S. PATENT DOCUMENTS

| | | | |
|---|---|---|---|
| 5,987,065 A | * 11/1999 | Candage | 375/232 |
| 6,006,256 A | 12/1999 | Zdepski et al. | |
| 6,012,101 A | 1/2000 | Heller et al. | |
| 6,038,616 A | 3/2000 | Heller et al. | |
| 6,078,974 A | 6/2000 | Kirshtein | |
| 6,119,146 A | 9/2000 | Heller et al. | |
| 6,160,543 A | * 12/2000 | Chen | 345/213 |
| 6,185,643 B1 | 2/2001 | Kirshtein et al. | |
| 6,212,584 B1 | * 4/2001 | Nei | 710/72 |
| 6,308,215 B1 | * 10/2001 | Kolbet et al. | 709/233 |
| 6,381,666 B1 | 4/2002 | Kejser et al. | |
| 2002/0010821 A1 | * 1/2002 | Yu et al. | 710/100 |

* cited by examiner

SYSTEM AND METHOD FOR COMBINING COMPUTER VIDEO AND REMOTE UNIVERSAL SERIAL BUS IN AN EXTENDED CABLE

BACKGROUND OF THE INVENTION

1. Field of the Invention

The present invention relates generally to computer systems equipped with video capabilities and a Universal Serial Bus (USB), and specifically to combining video data with USB data transfers over an extended USB.

2. Description of the Related Art

The Universal Serial Bus (USB) is a serial bus standard that provides a method of coupling peripheral devices to a computer system. USB was developed by Intel Corporation as a general purpose port, with the intention of eliminating jumpers, IRQ settings, DMA channels, and I/O addresses. USB supports data exchange between a host computer and a wide range of simultaneously accessible devices which share USB bandwidth through a token scheduled protocol. The bus allows peripherals to be attached, configured, used, and detached while the host is in operation. The USB allows many (e.g., up to 127) devices to be daisy-chained with a single standard connector. USB supports devices that transfer data from 1.5 Mbps to 12 Mbps, and is expected to support transfer rates up to 480 Mbps under the USB 2.0 Protocol Specification. By continually polling the bus for devices, users may "hot-plug" peripherals into the system and use them without rebooting.

The USB technology may greatly simplify the complex cabling that typically spills out from the back of personal computers. USB peripherals may include keyboard, mouse, phone/answering machine, printer, scanner, fax/modem, ISDN, tablet, game controller, light pen, digital audio, and any other USB compliant device. The USB protocol assumes a short bi-directional connection between the local and remote ends of the USB network. The consequently short latencies for packet transmission allow the USB to be transaction oriented (e.g. token, data, and handshake are all completed before the next transaction begins) with very little performance loss.

The USB cable is a four wire cable, and the maximum cable length is about 5 meters. There are typically two connector types, and no cross-over cables and adapters are needed. The maximum USB cable length of about 5 meters results from the fact that the USB Controller considers any transmission return time greater than a characteristic threshold value to be an error. USB cable lengths greater than about 5 meters may generate longer return times than the specified threshold value, and thus 5 meters is the maximum USB cable length. This 5 meter constraint may severely restrict the manner in which USB is used, especially given the fact that peripherals may be chained together sequentially. For example, in some situations it may be desirable to operate a USB and associated USB peripherals at a remote location from the associated host computer.

FIG. 1: A Host Computer With USB Peripherals

FIG. 1 illustrates a USB system. As FIG. 1 shows, a host computer system 108 may be coupled to various USB compliant peripherals, such as a keyboard 110A, and a mouse 110B through a Universal Serial Bus (USB) 220. A display device or monitor may also be connected to the computer system 108 through a monitor/video cable.

FIG. 2: A Block Diagram Of a Host Computer With USB Peripherals

FIG. 2 is a block diagram of a host coupled to a variety of peripheral devices through a USB. As FIG. 2 shows, the host computer system 108 may be coupled to USB compliant peripherals, including keyboard 110A, and mouse 110B through Universal Serial Bus (USB) 220. Host computer 108 may include a USB Controller 230 for coupling to USB communication medium 220. Host computer 108 may be operable to send and receive data to and from the USB peripherals shown through USB Controller 230. Host computer 108 may include USB driver software 240 which interfaces to the USB Controller 230 and facilitates communication with the USB peripheral devices. As mentioned above, there is a requirement that the total USB cable length not exceed 5 meters.

FIG. 3A: USB System Software Architecture

FIG. 3A is a block diagram of the software architecture of a USB system. As FIG. 3A shows, the top layer of the software architecture is application software 302. The application software 302 may be any software program which may be operable to provide an interface for control of or communication with a USB peripheral device. A USB driver program 240 may be below the application software 302. The next software layer may be OHCI driver software 306, which interfaces with the relevant hardware; i.e., the USB Controller hardware 230. The USB Controller hardware 230 communicates through USB bus 102 to various USB peripherals 110.

FIG. 3B: USB System Software/Hardware Architecture

As FIG. 3B shows, system software 310 may include software modules that effect USB operation including client driver software 311 (which may be used by application software 302), USB driver 240, and a Universal Host Controller Driver (HCD) 306. As FIG. 3B also indicates, a hardware implementation of the system is shown in hardware 230, including Universal Host Controller (HC) 230 and USB device 110, which may be coupled by USB 102. The timing issues which results in the cable length problem exist in the host controller 230, which relies on timely acknowledgements from USB devices 110 as described in the USB specification. The host controller 312 is specified in the USB standard as having a temporal window of valid reception after each transmission between any two USB devices (controller, hubs, user devices, etc.). This period of time is 70 nanoseconds, 30 nanoseconds of which may be committed to electronic processing time in the USB Controller hardware and the other 40 nanoseconds represents the maximum time-of-flight of the data through the connecting cable. This 40 nanosecond time-of-flight issue influences the cable length limit. This timing issue is endemic to the USB process and cannot be altered. Such timing issues are described in detail below with reference to FIG. 5.

FIG. 4: USB Data Delivery Packets

The USB is a polled bus, which means the host controller initiates all data transfers. Most bus transactions involve the transmission of up to three packets. FIG. 4 is a block diagram of a typical bus transaction. Each transaction begins when the host controller, on a scheduled basis, sends a USB packet 402 describing the type and direction of transaction 410, the USB device address 412, and endpoint number 414. This packet may be referred to as the "token packet." The USB device that is addressed selects itself by decoding the appropriate address fields.

In a given transaction, data may be transferred either from the host to a device or from a device to the host. The direction of data transfer may be specified in the token packet 402. As FIG. 4 shows, the source of the transaction then sends a data packet 404 containing the data to be transferred 416 or indicates it has no data to transfer. The destination, in general, responds with a handshake packet 408 indicating whether the transfer was successful 418.

Some bus transactions between host controllers and hubs involve the transmission of four packets. These types of transactions may be used to manage the data transfers between the host and full-/low- speed devices. The USB data transfer model between a source or destination on the host and an endpoint on a device may be referred to as a pipe. There are generally two types of pipes: stream and message. Stream data has no USB-defined structure, while message data does. Additionally, pipes have associations of data bandwidth, transfer service type, and endpoint characteristics like directionality and buffer sizes. Most pipes come into existence when a USB device is configured. One message pipe, the Default Control Pipe, always exists once a device is powered, in order to provide access to the device's configuration, status, and control information. The transaction schedule allows flow control for some stream pipes. At the hardware level, this prevents buffers from underrun or overrun situations by using an acknowledgement (ACK) handshake to throttle the data rate. When acknowledged, a transaction may be retried when bus time is available. The flow control mechanism may permit the construction of flexible schedules that accommodate concurrent servicing of a heterogeneous mix of stream pipes. Thus, multiple stream pipes may be serviced at different intervals and with packets of different sizes.

FIG. 5: Time-out Limitations Of USB

FIG. 5 illustrates the data send and acknowledgement process in a USB system as related to transmission time-outs. Referring to FIG. 5, a Data Link 504 provides a transmission medium between a Source 510 such as a USB device and a Destination 520 such as a host computer system. At time T=0 Packet 502 may be sent from the Source 510 and received at the Destination 520 at time T=A. Then, as shown in FIG. 5, at time T=B ACK 504 may be sent from the Destination 520, and received by the Source 510 at time T=C. Now, as long as C (the time of the reception of the ACK 504 from Destination 520) is less than the time-out specification of the Source 510, the Source 510 may consider the transmission transaction a success and may proceed to send the next packet of data to the Destination 520. If the timeout is exceeded the failing packet may be retransmitted by the Source 510.

Limiting the amount of time for the turnaround acknowledgment may limit the usefulness of the data exchange process in that transmission cables may be strictly limited in length to avoid time-outs. Externally increasing this timing window may result in either the ability to add the time to do processing to the data exchange chain or time to increase of the time-of-flight in the medium of the signals themselves, thus increasing the maximum cable lengths allowed by the system.

FIG. 6A: A Technique For Solving The Time-Out Problem

One approach to circumventing the time-out limitations inherent in the USB protocol is to avoid one of the timing specifications, specifically the shorter of the two, which is the time-of-flight in the cable. This may be done by circumventing this aspect of the USB 1.0 process. Such an interface is illustrated by FIG. 6A. As FIG. 6A shows, a source local PC based Host Controller 108 may be connected through Link A 630 to a special interface 602 which fulfills all the PC's USB needs for seeing less than one data bit in the cable at a single time in Link A 630. A special Hub 604 may be located at the device end of the system which provides the same service to the UBS Devices 110 attached to the system, that is, it assures that only one bit may be in the cable at the end at one time for Link C 650. It should be noted that Link A 630 and Link C 650 may be USB compliant.

In Link B 640, which is between the Interface 602 and the Hub 604, the "one bit in the cable at one time" rule of the USB specification is not applied. Only the overall packet response time issue is of concern. The length of the Link B 640 becomes a time/length accounting issue. As FIG. 6 shows, both the Interface 602 and Hub 604 represent process delays of 40 nS. This is also true for the end USB devices 110. Each of the standard cable lengths represents about 30 nS more delay. Given that there may only be a maximum of 415 ns in travel each way, and the cables and process each way take up roughly 160 nS (30+40+40+30 +20 (half of the last turn around)), approximately 255 nS remain for signal propagation through Link B 640. In a standard cable with 65% the velocity of the speed of light as a propagation rate, the maximum distance allowable for Link B is approximately 160 feet for the single run. The addition of the two 16 foot cables at each end may then permit the cable length to be expanded from about 15 feet to about 200 feet. In this way the USB rules may be violated to permit the extension of the line.

Disadvantages of the above solution include the fact that workable solutions typically involve non-standard solutions that can further exacerbate irregularities in the communications system, there may be a reduction of robustness and accuracy in the communications system, and finally, the above solution reduces the number of allowed Hubs to one from five and thus the number of USB Function Devices that the system can accommodate.

FIG. 6B: A Second Technique For Solving The Time-Out Problem

A second technique for addressing the time-out problem involves the placement of several USB hubs in series. Such a configuration is shown in FIG. 6B. As FIG. 6B shows, host computer 108 may be coupled through USB to a USB hub 611A. USB hubs 611B through 611E may be connected in series through USB. USB devices 110 may be connected to USB hub 611E. Using this technique, up to five hubs may be connected in series for a total distance of 30 meters (about 99 feet). This process, in effect, simulates additional in-line hubs allowing additional cable lengths corresponding to the process times (40 ns) of each hub. This techniques has, however, two basic problems:

1. By adding hubs in series to extend the distance between the computer and the final USB hub (assumed to be the "work place" or "desk top"), the total number of USB devices that may be connected to the system may be dramatically reduced. More specifically, as a USB hub is typically an eight port unit, and USB may typically handle up to 127 USB devices, the effective capacity of the USB may be reduced by a factor of 15 to accomplish the USB cable extension process. To retain full use of the USB system may still require a limit of 16 feet on cable lengths.

2. Even if the limitation on the number of USB devices is acceptable, the maximum distance that the USB hub may be extended is still less than 100 feet.

As mentioned above, it may be desirable to operate USB and associated USB peripherals at a remote location from the associated host computer. It may also be desirable to operate a display device, such as a video monitor, at a remote location. Therefore, improved methods for transmitting video signals in a remote USB system are needed.

SUMMARY OF THE INVENTION

A system and method is presented for operating a display device and one or more USB peripherals remotely from a host computer. The system may include a host computer system including a processor and a memory, a display device, one or more USB peripherals. The system may include a local extender operable to couple to the host computer system and a remote extender operable to couple to the local extender and to the display device and the one or more peripherals. The local extender may include a first video converter and a USBX host controller both of which may be operable to couple to the host computer system. The remote extender may include a second video converter operable to couple to the display device and a remote USB interface device operable to couple to the one or more peripherals. In one embodiment the USB interface device may be a Remote Root Hub.

The Remote Root Hub may be located a distance from the host computer system which is greater than a maximum distance specified in a USB protocol specification, e.g., greater than 5 meters. In one embodiment the distance may be greater than 10 meters.

In one embodiment the local extender may be comprised on the host computer system. In another embodiment the host computer system may be comprised on a card or "blade" which is installed in a chassis. In one embodiment, the local extender may simply be a component on the "blade". Similarly, in one embodiment the remote extender may be comprised in the display device, wherein the one or more peripherals may be coupled to the remote extender via connections on the display device. In other embodiments the remote extender may be comprised on the keyboard, or any other peripheral device.

The local extender may be coupled to the remote extender through a non-USB compliant bus comprising four twisted wire pairs, which in one embodiment may comprise a category 5 cable. Three of the four twisted wire pairs may be operable to communicate Red, Green, and Blue (RGB) video signals from the local extender to the remote extender, and the remote extender may be operable to send the RGB video signals to the display device. One of the four twisted wire pairs may communicate peripheral data between the local extender and the remote extender, which may then send the peripheral data to, or receive the peripheral data from, the one or more USB peripherals.

The host computer system may generate a video signal intended for the display device, as well as one or more peripheral signals intended for the one or more peripherals. The first video converter of the local extender may receive the video signal, convert the signal to a form which is compatible with transmission over the cable, and transmit the signal to the second video converter in the remote extender. The USBX host controller may receive the one or more peripheral signals from the host computer system over an internal computer bus, such as a PCI bus, convert the signals to a non-USB compliant bus protocol, such as Universal Serial Bus Extension (USBX) packets, and transmit the USBX packets to the remote USB interface device in the remote extender. In addition, the remote USB interface device may receive on or more peripheral signals from peripheral devices, typically input devices such as a mouse or keyboard.

The video data may further comprise HSync and VSync video synchronization signals which may comprise pulses which may be converted from standard length pulses to short pulses by the local extender for transmission over the cable to the remote extender. The remote extender may further comprise a pulse sharper which may convert the short pulses back to standard length pulses for use by the display device.

In one embodiment the HSync and VSync video synchronization signals may be transmitted over two of the three wire pairs used for transmitting the RGB video signals. In an alternate embodiment the HSync and VSync video synchronization signals may be transmitted over the one twisted wire pair used to communicate the peripheral signals to the remote extender. In this case the HSync and VSync video synchronization signals may be received by the Remote Root Hub which may send the signals to the pulse shaper, described above.

In one embodiment the remote extender may further include three delay components operable to couple to the three twisted wire pairs, wherein the three delay components may be operable to synchronize the Red, Green, and Blue video signals to compensate for different time-of-flight values for each of the three twisted wire pairs.

In one embodiment the remote extender may further comprise four equalization components coupled to the four twisted wire pairs, and which may compensate for attenuation of low (DC) and high frequency signals due to the length of the four twisted wire pairs.

Thus the system and method described above may allow the remote location of user interface peripheral devices such as keyboards and pointing devices (such as a mouse) from the host computer at a distance greater than that allowed by the USB specification. The system and method may also allow the remote location of a video monitor from the host computer using cabling used for extending the operational distance of USB peripheral devices. Thus, cabling requirements may be reduce from separate video and USB cables to a single thin category 5 cable which is a common and inexpensive component.

BRIEF DESCRIPTION OF THE DRAWINGS

Other advantages and details of the invention will become apparent upon reading the following detailed description and upon reference to the accompanying drawings in which.

Figure 1:
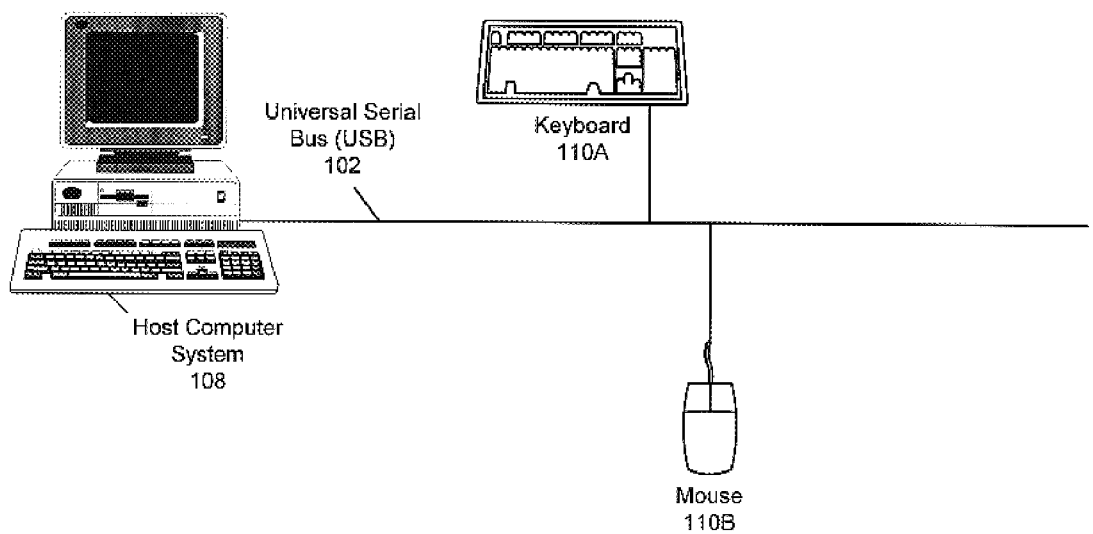
FIG. 1 illustrates a system comprising a host computer coupled to peripherals through USB.
Figure 2:
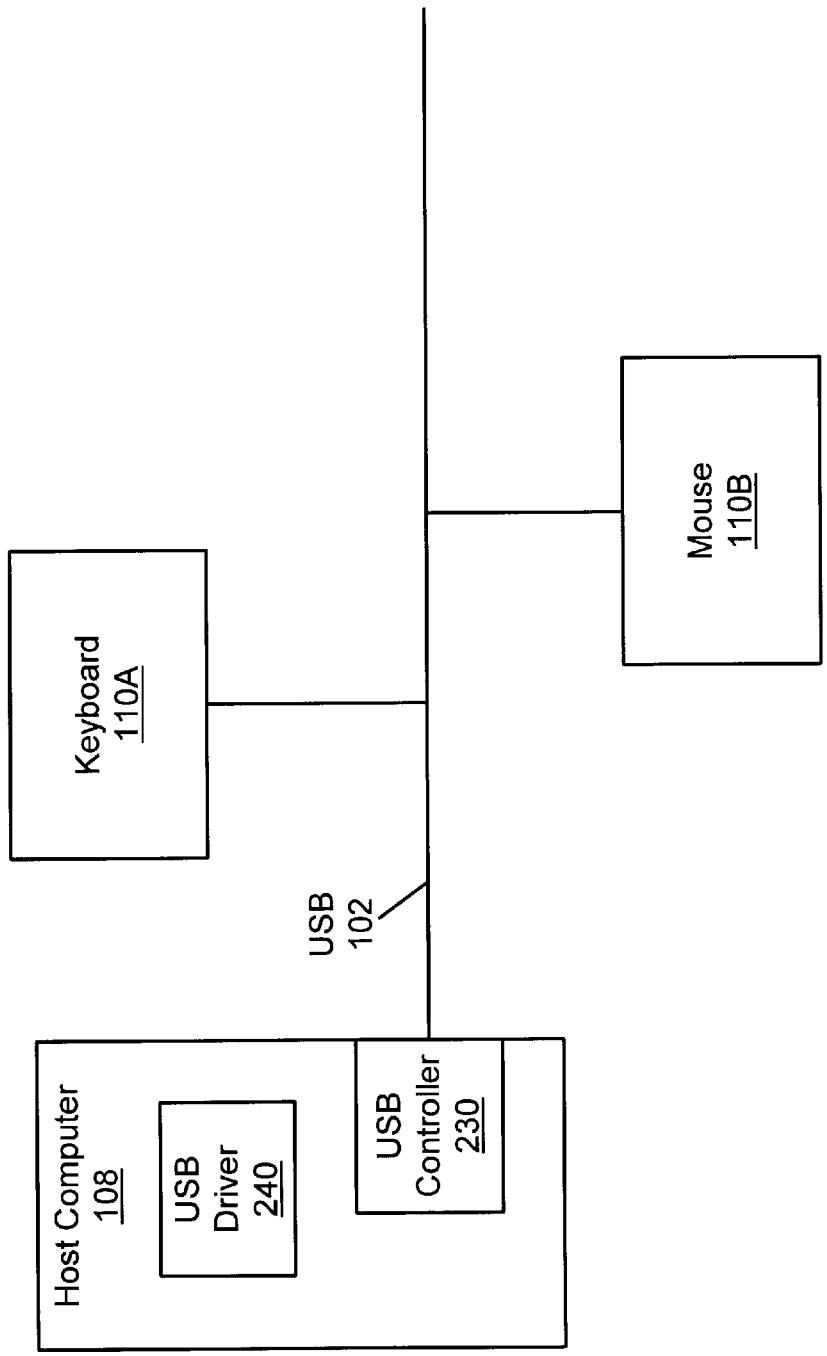
FIG. 2 is a block diagram of the system of FIG. 1.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

U.S. Provisional Patent 60/144,809 titled "A Technique To Extend The Operating Distance Of A Universal Serial Bus" is hereby incorporated by reference in its entirety as though fully and completely set forth herein.

U.S. Pat. No. 6,119,146 titled "Computer Network Having Multiple Remotely Located Human Interfaces Sharing A Common Computing System" by Heller, et al., is hereby incorporated by reference in its entirety as though fully and completely set forth herein.

U.S. Pat. No. 6,038,616 titled "Computer System With Remotely Located Interface Where Signals Are Encoded At The Computer System, Transferred Through A 4-Wire Cable, And Decoded At The Interface" by Thornton, et al., is hereby incorporated by reference in its entirety as though fully and completely set forth herein.

U.S. Pat. No. 6,037,884 titled "Technique To Encode Multiple Digital Data Streams In Limited Bandwidth For Transmission In A Single Medium" by Thornton, is hereby incorporated by reference in its entirety as though fully and completely set forth herein.

U.S. Pat. No. 6,020,839 titled "Analog Technique To Detect Asymmetric Radio Frequency Pulses", by Thornton, is hereby incorporated by reference in its entirety as though fully and completely set forth herein.

U.S. Pat. No. 6,012,101 titled "Computer Network Having Commonly Located Computing Systems" by Heller, et al., is hereby incorporated by reference in its entirety as though full and completely set forth herein.

U.S. Pat. No. 5,994,952 titled "Narrow Band-Pass Interferometric Filter Having Enhanced Operational Characteristics" by Thornton, is hereby incorporated by reference in its entirety as though fully and completely set forth herein.

U.S. Pat. No. 5,966,056 titled "Method And Apparatus For Enabling The Transmission Of Multiple Wide Bandwidth Electrical Signals" by Thornton, is hereby incorporated by reference in its entirety as though fully and completely set forth herein.

U.S. Pat. No. 5,926,172, titled "Video Data Transmission And Display System And Associated Methods For Encoding/Decoding Synchronization Information And Video Data" by Hanley, is hereby incorporated by reference in its entirety as though fully and completely set forth herein.

U.S. patent application Ser. No. 09/179,809 titled "A Technique To Transfer Multiple Data Streams Over A Wire Or Wireless Medium" is hereby incorporated by reference in its entirety as though fully and completely set forth herein.

Figure 7:
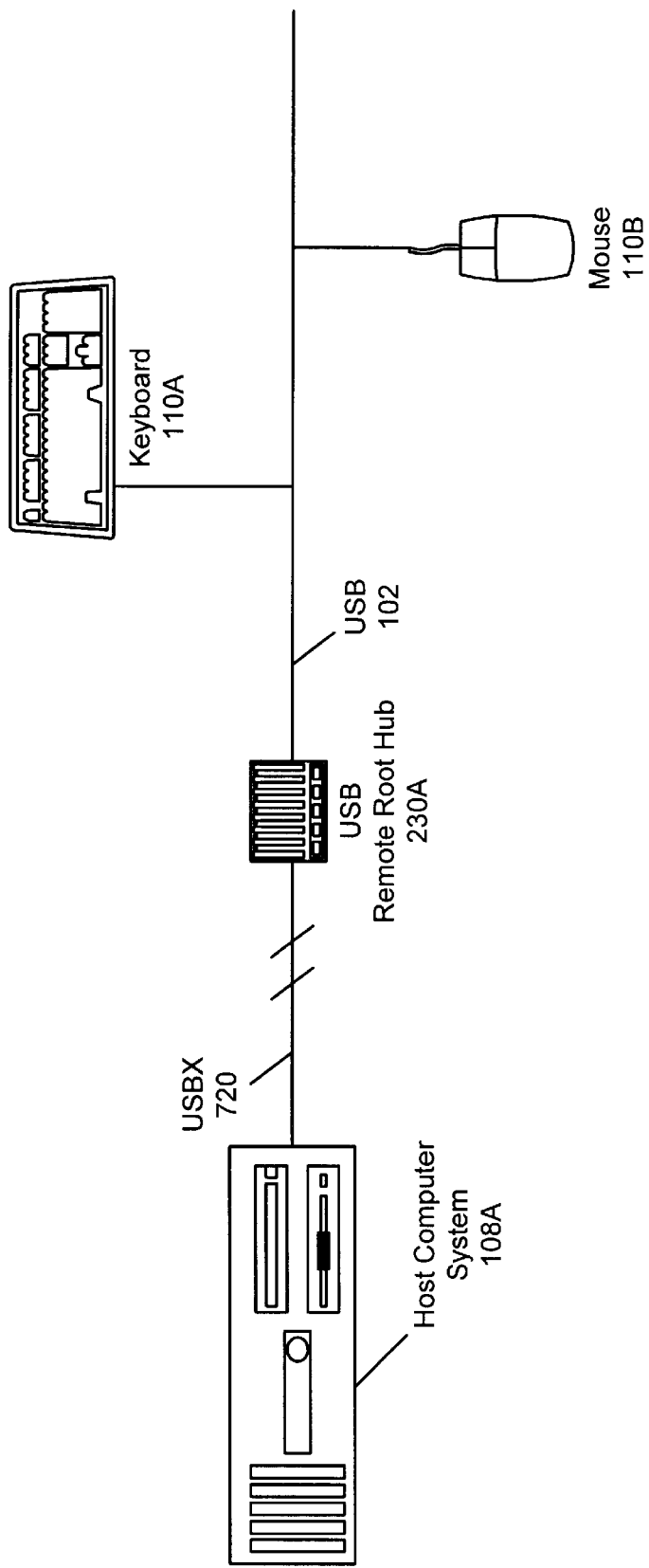
FIG. 7 illustrates a system wherein the USB bus and associated USB peripherals are located remotely from the host computer.

FIG. 7: A Host Computer Coupled To USB Peripherals Through A USB Extender

FIG. 7 illustrates a USB Extension system according to one embodiment. As used herein, the term "USB Extension" may be referred to as USBX. It is noted that systems and methods described herein may be used in various types of systems wherein a host computer communicates with one or more remote external USB devices. Host computer system 108A may contain a USBX Controller (see FIG. 8), which may be coupled to a USB Remote Root Hub 230A through a USB Extension bus 720, also referred to as a USBX bus. In one embodiment, the USBX bus may be a non-USB compliant bus that enables extension of a USB compliant bus to a greater distance from the host computer 108A than that allowed by the USB specification. Thus, in one embodiment, the cable of the USBX bus 720 may be much longer than the maximum allowed USB cable length of 5 meters, therefore providing the capability to control peripheral USB devices far beyond the typical range of USB as specified in the USB protocol specification, i.e., "the USB specification". In one embodiment, the USBX bus cable length may exceed 10 meters.

As can be seen in FIG. 7, the USB Remote Root Hub 230A may be located remotely from the host computer 108A. The USB Remote Root Hub 230A may be coupled to keyboard 110A and mouse 110B through the USB 102. The number and type of peripherals shown are for illustration purposes only, the actual number and type of peripheral devices may be different, and may include floppy drives, tape drives, CD ROMs, scanners, or any other USB compliant device.

In one embodiment, the invention may be implemented in a system as described in U.S. Pat. No. 6,012,101 by Heller, et al., and which is incorporated by reference above. In particular, host computer system 108A may be a rack-mounted system in which all computer hardware not related to the user interface, including hard drives, CPUs, motherboard, expansion cards, interface cards, etc., may be contained in a rack-mounted Personal Computer (PC) chassis, herein referred to collectively as "the host." In particular, as shown in FIG. 7, the user interface peripherals 110 may be USB compliant devices which may be coupled to the USB Remote Root Hub 230A via standard USB 102. The USB Remote Root Hub 230A may be located in the vicinity of the user interface peripherals subject to standard USB cabling distance limitations as described in the USB specification, and may thus be located remotely from the host 108A. The USB Remote Root Hub 230A may in turn be coupled to the host 108A through USBX bus 720. The user interface devices, such as keyboard, monitor, floppy drive, CD-Rom, or other user interface hardware, may be located remotely from the rack-mounted host 108A. The user interface devices may be thus coupled to the host 108A through the USB Extension (USBX) system. As used herein, the term "USBX system" refers to all of the components coupling the host computer to the USB devices, and may include USBX Controller 830 (see FIG. 8), USBX bus 720, USB Remote Root Hub 230A, and USB bus 102.

In another embodiment, a plurality of host computers 108A may be rack-mounted in a central location with each host computer's peripheral devices, such as keyboard 110A and mouse 110B, connected to the host computer through the USBX system, thereby allowing central administration and management of the host computers 108A while providing remote access to the host computers 108A by users through the peripherals 110A and 110B.

Figure 8:
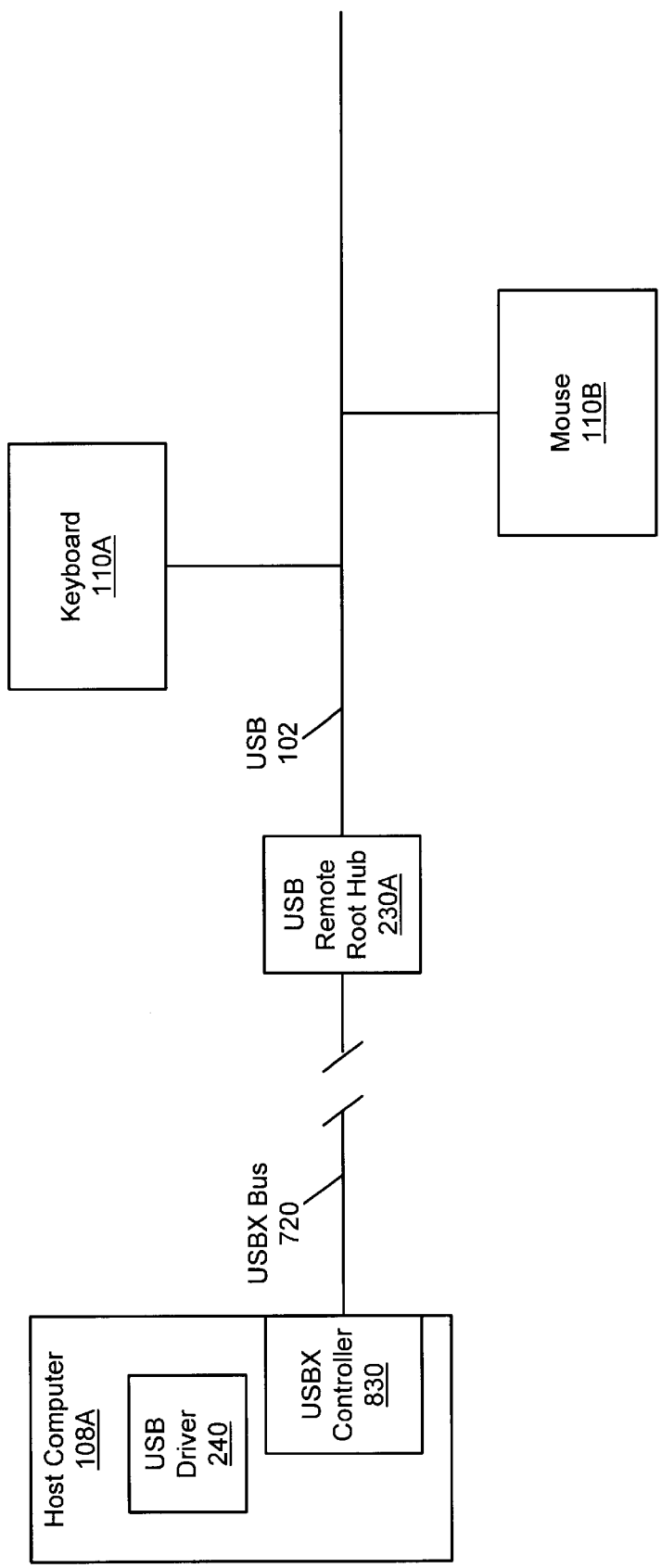
FIG. 8 is a block diagram of the system of FIG. 7.

FIG. 8: A Block Diagram Of A Host Computer Coupled To USB Peripherals Through A USB Extension System FIG. 8 is a block diagram of the system shown in FIG. 7. FIG. 8 illustrates in block diagram form the host computer system 108A coupled to the USB peripheral devices 110 mentioned above with reference to FIG. 7, including keyboard 110A and mouse 110B. Host computer 108A includes a specialized Host Controller 830, which may also be referred to as a USBX Controller 830, and which may be coupled to USBX bus 720. The USBX bus 720 may in turn be coupled to remote USB Remote Root Hub 230A. USB Remote Root Hub 230A may be coupled to the USB peripheral devices through USB 102. In one embodiment, various aspects of the invention may be implemented in the USBX Controller 830, the USB Remote Root Hub 230A, and the USBX bus 720. In other words, in one embodiment, USBX Controller 830, the USB Remote Root Hub 230A, and the USBX bus 720 operate together to extend the USB bus to a greater distance than that specified by the USB specification.

Thus the USB Remote Root Hub 230A may not be solely a standard USB controller, but rather may include logic which may operate in extending the USB bus 102. The USB Remote Root Hub 230A appears to USB devices 110A and 110B as a standard USB host controller. The USB Remote Root Hub 230A also, however, may include additional logic which may be operable to translate USBX packets to and from USB packets according to translation rules provided below with reference to FIG. 14. A USB packet sent from a USB device may thus be translated to a USBX packet by the USB Remote Root Hub and sent over the USBX bus 720 to the Host (USBX) Controller 830. Similarly, a USBX packet received from the host (USBX) controller 830 over the USBX bus 720 may be translated to a USB packet and sent to the USB device 110 over the USB 102.

Figure 9:
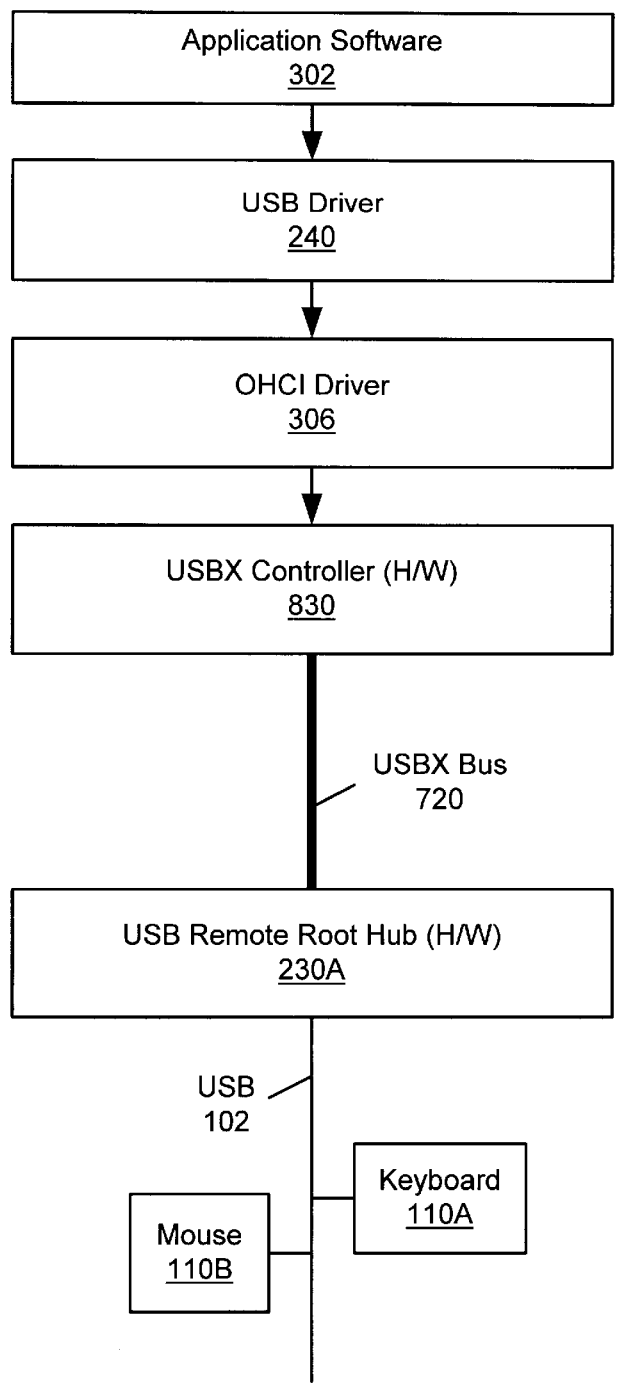
FIG. 9 is a block diagram of the software architecture of the system of FIGS. 7 and 8.

In a similar manner, the USBX Controller or host controller 830 may not be solely a standard USB host controller, but may be operable to provide a standard USB interface, or API (Application Programming Interface) to the USB Driver 240 and the driver 306, while also providing an interface to the USBX bus 720 (see FIG. 9). Thus the USB Driver 240, and the OHCI driver 306 can operate unmodified, i.e., the USB Driver 240 and the driver 306 may not be "aware" that the USBX Controller 830 is intercepting communications between the USB Driver 240 and the USB Remote Root Hub 230. Similarly, the USBX Controller 830 allows the USB Remote Root Hub 230A to be located remotely from the host 108A, but the USB Remote Root Hub 230A remains "unaware" that the location is not local to the host 108A.

As mentioned above, the USBX bus 720 may not be a standard USB bus. The USBX bus 720 may operate to allow the communication of USBX packets between the USBX Controller 830 and the USB Remote Root Hub 230A. The USBX bus 720 does not share the cabling distance limitations of the standard USB bus 102, as described in the USB specification. As mentioned above with reference to FIG. 7, the USBX bus cable may be significantly longer than the 5 meter maximum allowed for USB bus cables as described in the USB specification.

In one embodiment the USB devices 110 may be "daisy-chained" together sequentially wherein each device includes a USB Hub for the next device to connect. In another embodiment, the USB bus 102 may be connected to a USB Hub to which the USB devices 110 may all be connected.

FIG. 9: USBX System Software Architecture

Figure 3A:
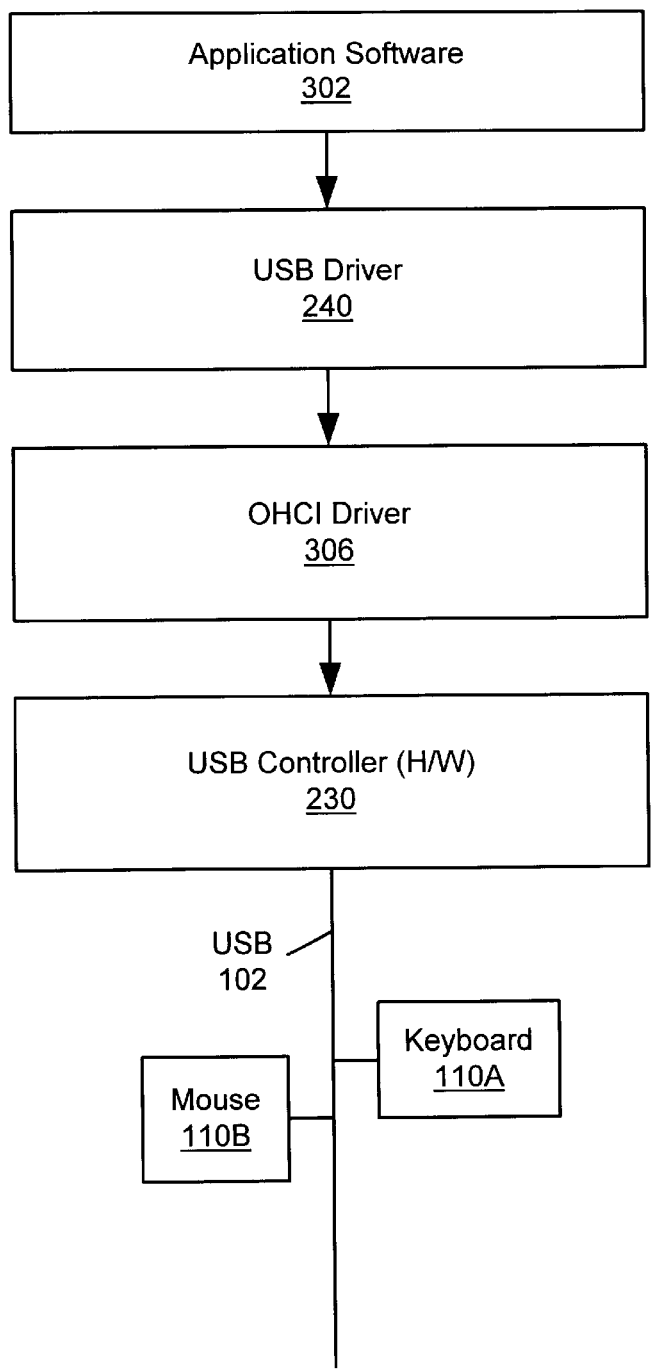
FIGS. 3A and 3B are block diagrams of the software and hardware architecture of a USB system.
Figure 3B:
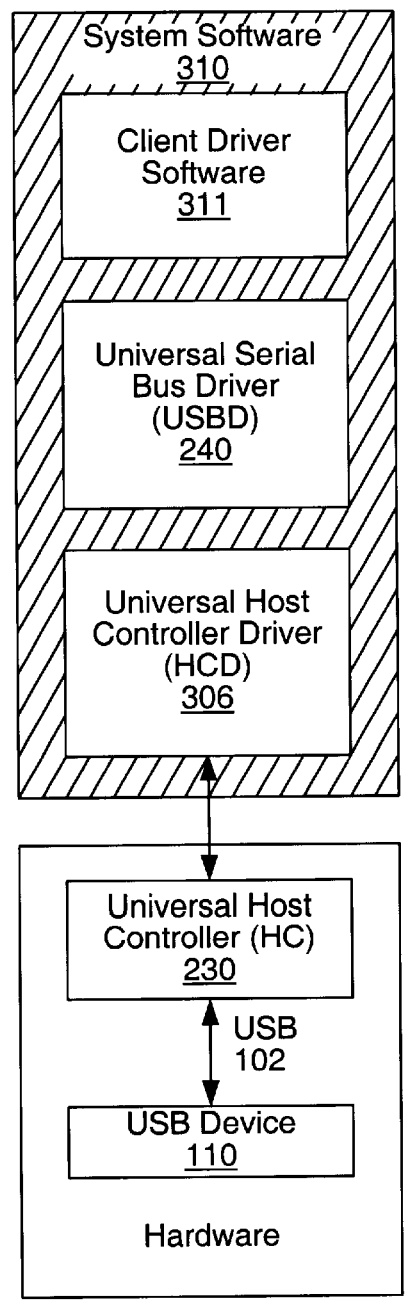
Figure 4:
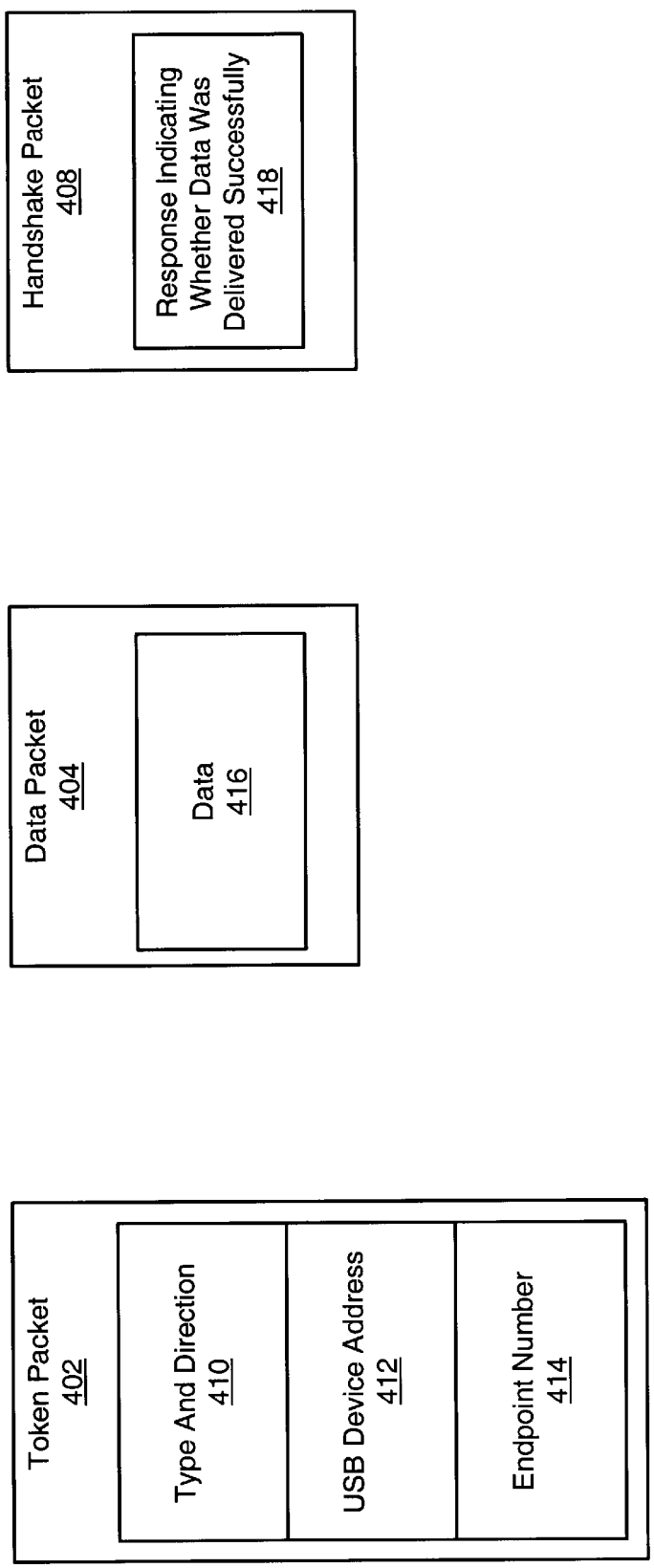
FIG. 4 is a block diagram of USB data packets.
Figure 5:
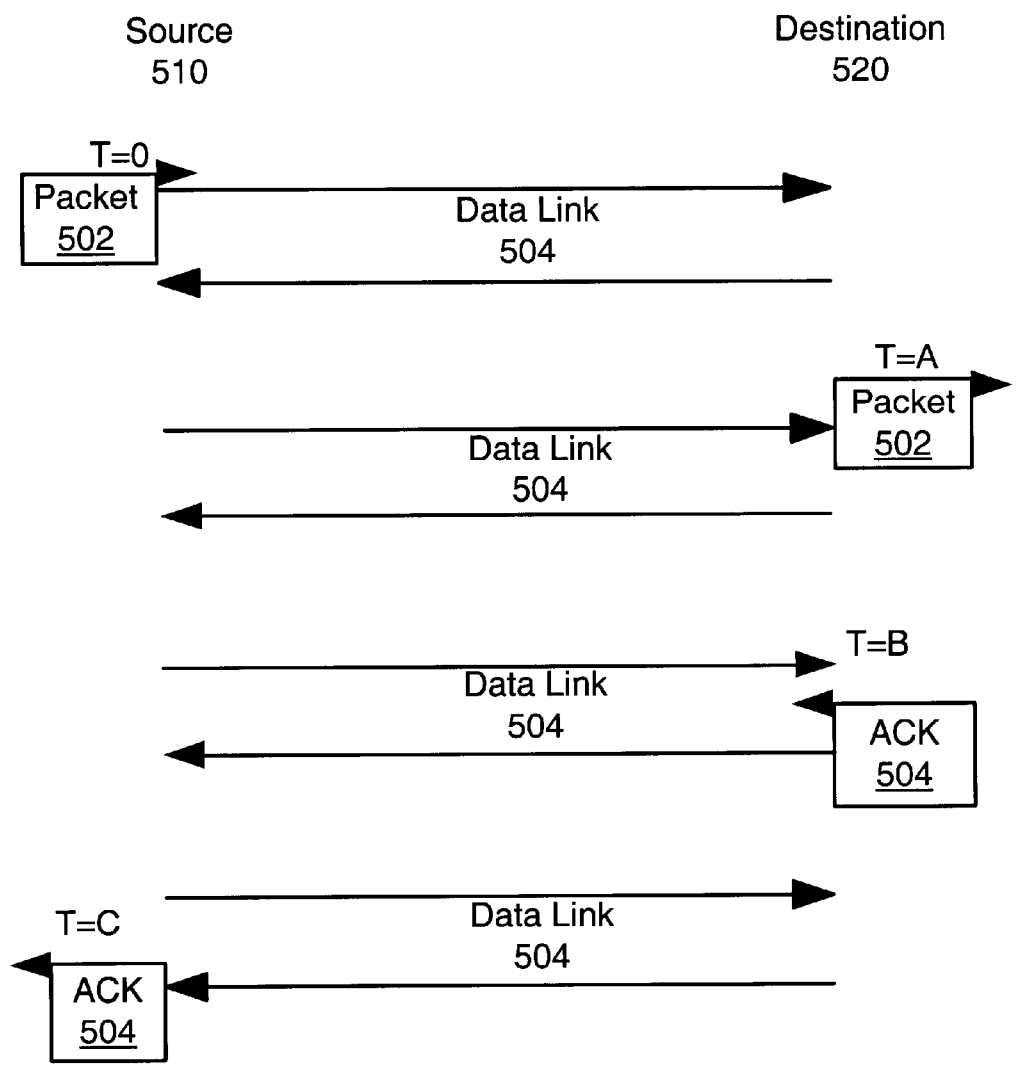
FIG. 5 illustrates time-out limitations of USB.
Figure 6A:
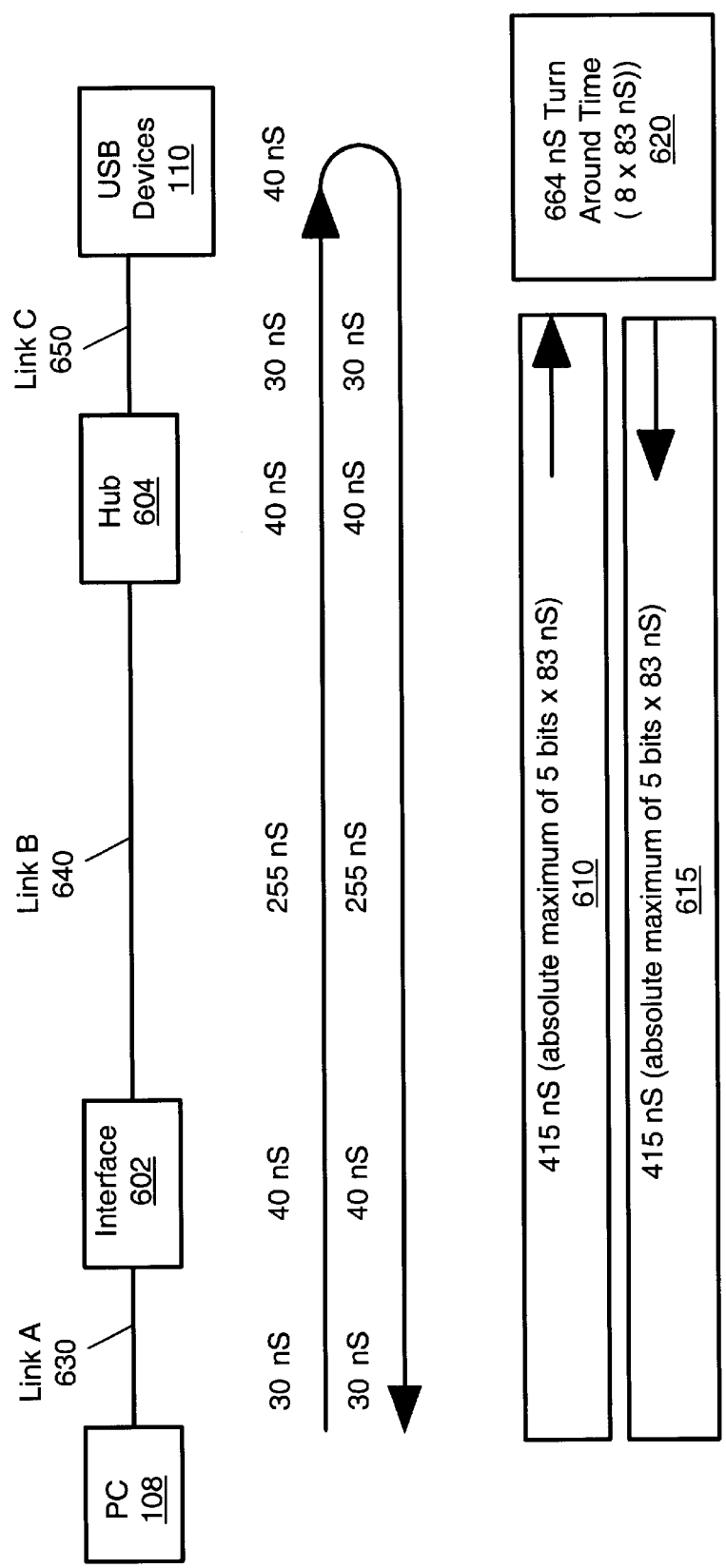
FIGS. 6A and 6B illustrate techniques for solving the USB time-out problem.
Figure 6B:
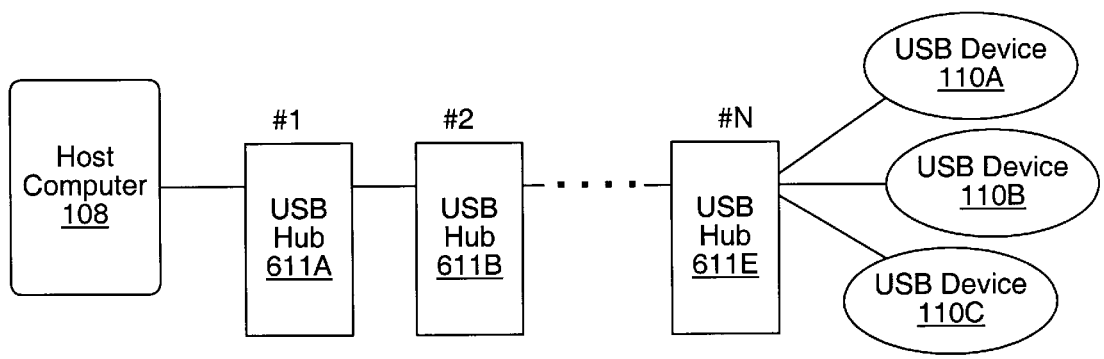

FIG. 9 is a block diagram of the software architecture of a USBX system. As described with respect to FIG. 3A, the top layer of the software architecture is application software 302. The application software 302 may be any software program which may be operable to provide an interface for control of or communication with a USB peripheral device. A USB driver program 240 which may be operable to facilitate communication with the USB peripheral devices may be below the application software 302. The next software layer may be OHCI driver software 906, which is designed to communicate with a standard USB controller. The OHCI driver may communicate with the USBX Controller hardware 830. The USBX Controller 830 may be operable to provide a standard USB interface or API (Application Programming Interface) to the layers above it, i.e., to the OHCI driver 306 and the USB driver program 240. Thus, the USB driver software 240 and the OHCI driver 306 consider the USBX Controller 830 to be a standard USB Controller. Therefore, standard prior art driver software (240 and 306) can operate unmodified. As FIG. 9 shows, the USBX Controller 830 may be coupled to the remote USB Remote Root Hub 230A through the USBX bus 720. The remote USB Remote Root Hub 230A may then be coupled through USB 102 to the USB peripheral devices mentioned above with reference to FIGS. 9 and 8, specifically, keyboard 110A and mouse 110B. The USBX Controller 830 provides an interface to the USB Remote Root Hub 230 such that the USB Remote Root Hub 230A may operate as if local to the host computer 108A, i.e., may be "unaware" of the intervening USBX Controller 830 and USBX bus 720.

Figure 10:
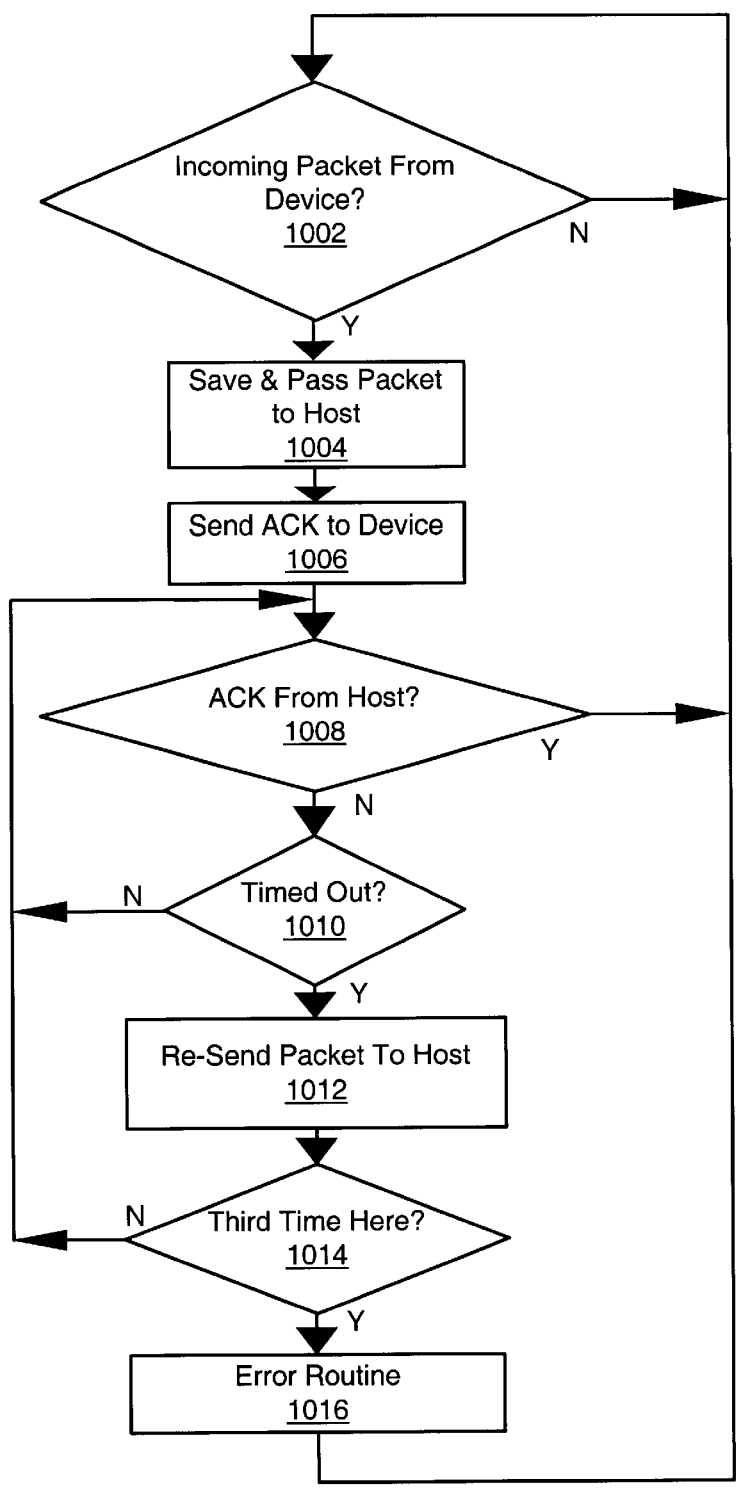
FIG. 10 is a flowchart of a USB data transfer process.

FIG. 10: USBX Data Transfer Process

FIG. 10 is a flowchart of the USBX data delivery process, and illustrates operation of USB Remote Root Hub 230A. As FIG. 10 shows, in 1002 a determination may be made by the USB Remote Root Hub 230A whether there is an incoming packet from a device, such as a USB Hub or peripheral. The device may be a USB Hub, or function device in a USB network. The USB Remote Root Hub 230A continues to poll or watch for the packet as represented by the "no" path in 1002.

If there is an incoming packet from the device, then in 1004 the packet may be saved and passed to host 108A. In one embodiment, the host 108A may comprise USBX Controller 830 which receives the packet.

In 1006, after the incoming packet has been received, an acknowledgement (ACK) may be sent by the USB Remote Root Hub 230A to the device signaling that the packet was received. The device may operate as if the acknowledgement is from the host 108A, when in fact, it originates with the USB Remote Root Hub 230A which is local to the device. In this manner, time-out issues associated with long distances between the device and the host 108A may be avoided. More specifically, sending the ACK may compel the device to operate as if the transaction were a success, thus freeing the device to process further data, i.e. the device operates as if the ACK were from the host 108A, when in fact the USB Remote Root Hub 230A sent the ACK.

In 1008, a determination may be made whether an acknowledgement has been received from the host 108A indicating that the packet was received by the host 108A. If the acknowledgement from the host 108A has been received, then the USB Remote Root Hub 230A may wait for a next incoming packet, as shown in 1002. If the acknowledgement from the host 108A has not been received, then in 1010 the USB Remote Root Hub 230A may check for a time-out condition.

If a time-out has not occurred the USB Remote Root Hub 230A may continue to wait for the acknowledgement from the host 108A, as shown in 1008. When a time-out condition occurs, the transition may be considered to have failed and, as indicated in 1012, the USB Remote Root Hub 230A may resend the packet to the host 108A.

In 1014, the USB Remote Root Hub 230A may check whether the packet has been resent to the host 108A for the third time. If not, then the USB Remote Root Hub 230A may continue to wait for the acknowledgement from the host 108A, as shown in 1008. If, on the other hand, the packet has been resent to the host 108A three times, then in 1016 an error routine may be called. The error routine may reset the system for fresh data, and the transaction may be considered a failure. In one embodiment, the transaction failure may be logged and/or reported to appropriate parties. In one embodiment, the maximum number of packet resends allowed may be greater or less than three.

Thus, in the process described above, the data packet may be held by the USB Remote Root Hub 230A for possible retransmission to the host 108A until the appropriate response is received from the host 108A. The retransmissions to the host 108A (in response to a reception failure) may be made independently of source (device) conditions or activity. Furthermore, the process effectively circumvents the time-out characteristic of the source return to achieve the operational characteristics of a longer source time-out interval.

Figure 11A:
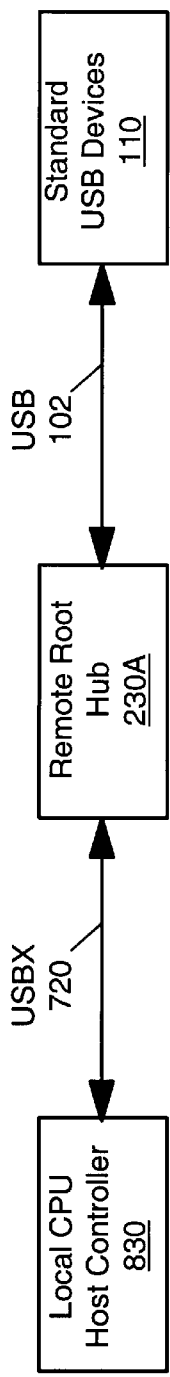
FIG. 11A is a detailed diagram of one embodiment of a system.

FIG. 11A: Detailed Diagram Of One Embodiment Of A System

FIG. 11A illustrates further details of one embodiment of a system. In particular, a technique of making a USB Remote Root Hub 230A Port local to the USB devices 110 and remote from the host computer 108A is shown. In this technique the close proximity of subsequent USB Hubs or the Functional USB devices 110 themselves may assure handshaking acknowledgement within the time out period specified for USB. The USB Remote Root Hub 230A may thus be responsible for guaranteed packet delivery to the local CPU.

As FIG. 11A Section A shows, a local CPU host controller 830 may be connected to a USB Remote Root Hub 230A via a connection running a modified USB protocol, i.e., USBX 720. The USB Remote Root Hub 230A may the provide the Root Hub Port of the USB network.

Figure 11B:
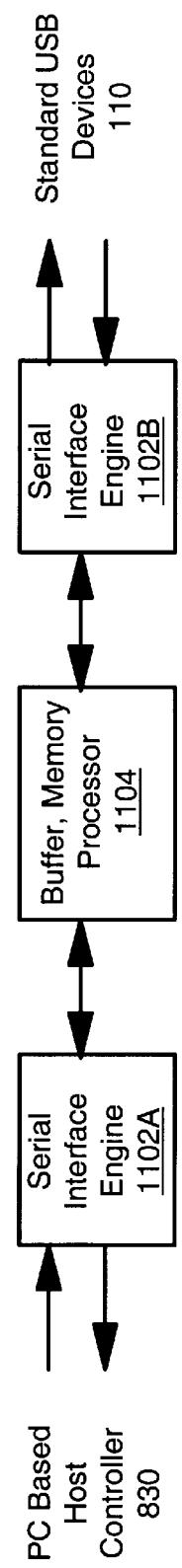
FIG. 11B is a block diagram of an architecture of a remote hub.

FIG. 11B: Architecture of A Remote Root Hub

FIG. 11B illustrates a general architecture of USB Remote Root Hub 230A in block diagram form. The USB Remote Root Hub 230A may manage two serial interfaces. The first connects the USB Remote Root Hub 230A to the local CPU/Host Controller 830, shown as Serial Interface Engine 1102A. In one embodiment, the interface 1102A may use the USBX protocol. The second serial interface is the standard USB Root Hub protocol, shown as Serial Interface Engine 1102B. In general packets flow from interface 1102A to interface 1102B with only minor changes required by the USB Remote Root Hub 230A. These minor changes may be made by the Buffer, Memory, and Processor shown in 1104. A pair of lines, each running at 24 megabits per second may provide the linkage between the PC Host Controller 830 and the USB Remote Root Hub 230A.

Figure 12:
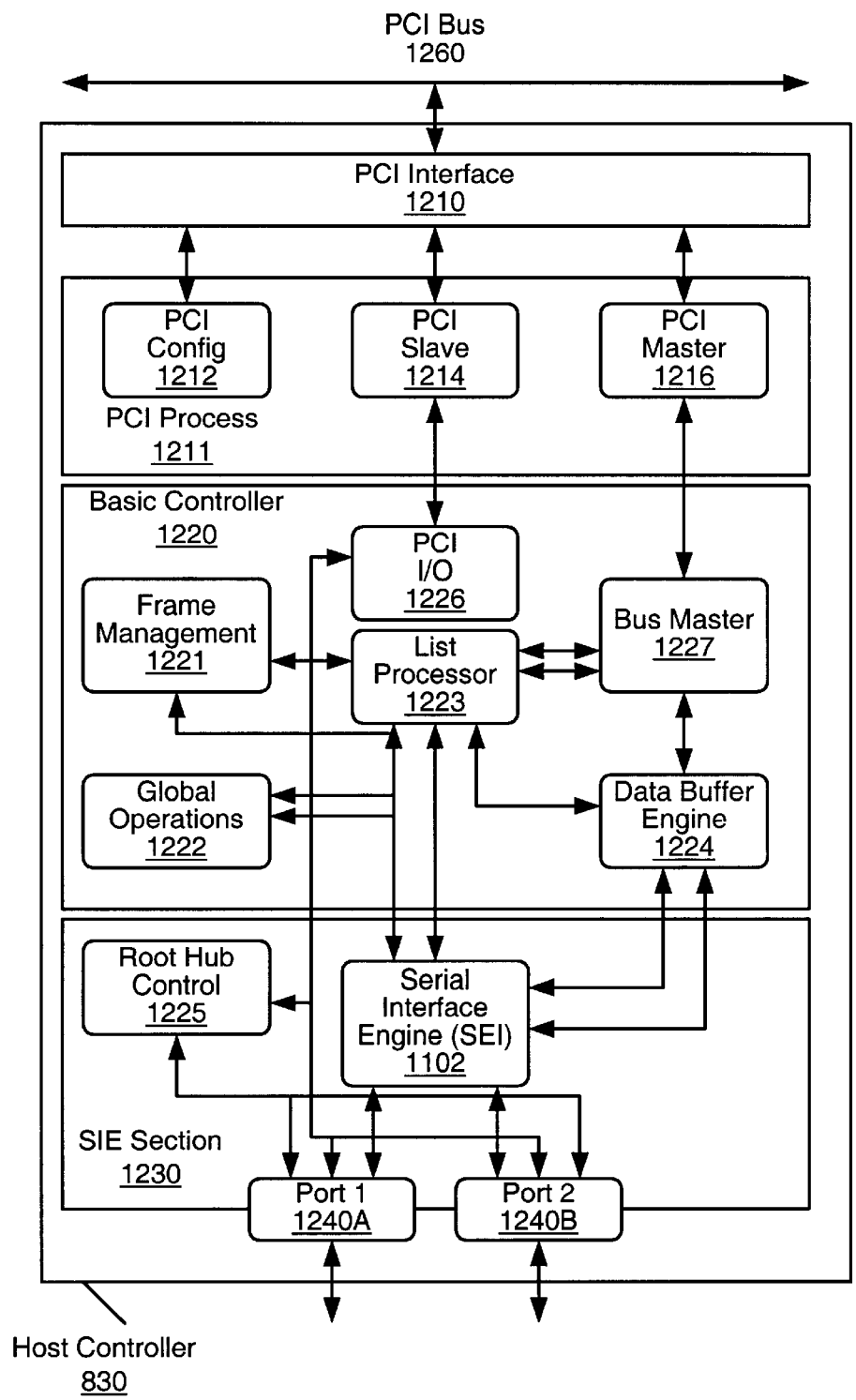
FIG. 12 is a detailed diagram of a host controller.

FIG. 12: A Block And Flow Diagram Of A Host Controller

FIG. 12 illustrates host controller 830. As FIG. 12 shows, host controller 830 may include the following primary elements: PCI interface 1210 and process 1211, basic controller 1220, and serial interface engine (SIE) section 1230. The PCI Interface 1210 may couple to a PCI Bus 1260, as well as to a PCI configuration module 1212, a PCI slave module 1214, and a PCI master module 1216, which may manage PCI interactions between the host controller 830 and the PCI bus 1260. The PCI interface 1210 and process 1211 may be coupled to the basic controller 1220 through a PCI I/O module 1226 and a bus master 1227. The basic controller 1220 modules may all be directly or indirectly coupled to SIE 1102 and ports 1240A and 1240B. The SIE module 1102 may be further coupled to ports 1240A and 1240B, as well as the root hub control 1225.

The processes that affect the timing issue may be located in the SIE 1102. Note that the SIE may communicate directly with the basic controller 1220 modules of frame management 1221, global operators 1222, list processor 1223, and data builder engine 1224. Ports 1240A and 1240B may be directly coupled with the SIE 1102, root hub control 1225, and PCI I/O module 1226.

Figure 13:
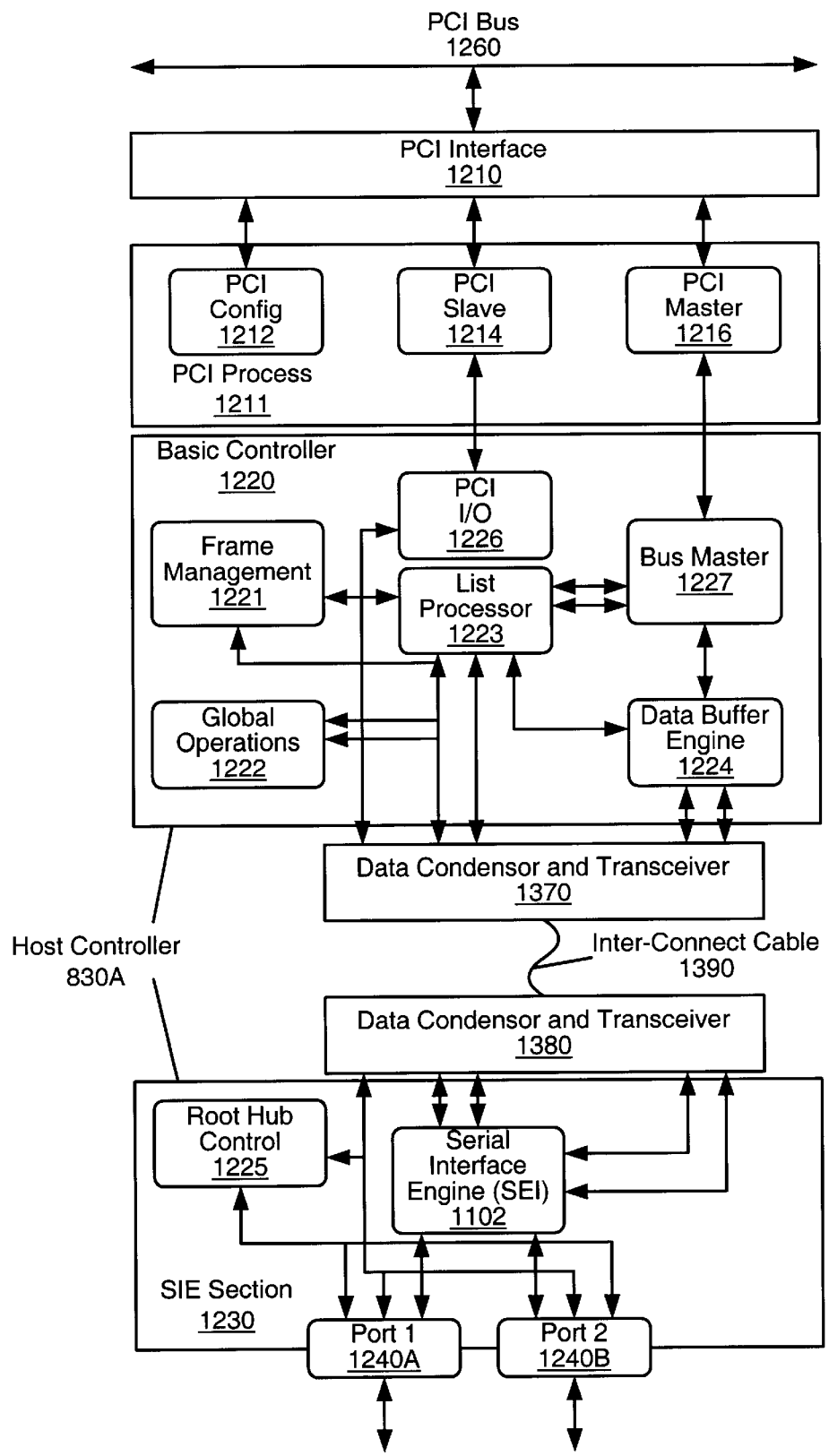
FIG. 13 illustrates separation of a serial interface engine from the remainder of a host controller.

FIG. 13: A Block And Flow Diagram Of A Host Controller With A Separated Serial Interface Engine FIG. 13 illustrates host controller 830A. As FIG. 13 shows, the basic controller 1220 and the SIE section 1230 may be separated but coupled to each other through a data condenser 1370 and data transceiver 1380, which may themselves be coupled through an interconnect cable 1390.

The data condensers 1370 and transceivers 1380 section may be located such that the data and control lines may be interrupted at a point which may make timing with respect to the outside world unimportant. Rather, only timing with respect to the relative data and control signals may be considered important. This approach may entail an actual split in the process flow of the standard USB interface as defined by the USB standard 1.0. The addition of the data condensers and transceivers may not alter the standard or its performance but may simply augment the distance that the signal may be sent.

The condenser 1370 and transceiver 1380 process may include organizing the data to be transferred between the two modular sections of the host controller 830A and sending the data in both directions using an amplitude domain modulation process. In one embodiment, multiple individual asynchronous data streams may be combined for simultaneous transmission via a single conductor. In one embodiment, a carrier signal may be modulated and demodulated on a half-cycle basis wherein each half-cycle is amplitude modulated (i.e., multiplied) by a fixed value representative of the data to be encoded. The fixed value may be applied to the half-cycle at zero-crossing and may be held steady for the duration of the half-cycle. In this manner, each half-cycle of a carrier signal may be modulated to contain data. For purposes of redundancy or security, two or more half-cycles may be used to contain the data, but in each case, the modulation still occurs on a half-cycle basis. For more detailed information regarding the data condenser/transceiver process please see co-pending U.S. patent application Ser. No. 09/179,809, filed Oct. 15, 1998, which is incorporated herein.

Thus, the system described above may accommodate the timing limitations of the USB specification while providing extended cabling distance beyond that specified by the USP specification. More specifically, the system may extend the operating distance of USB by interrupting the data and signal processing process just before the point of critical transmit-receive timing, and changing the construct of the data flow to a more appropriate form for long distance transport.

Figure 14:
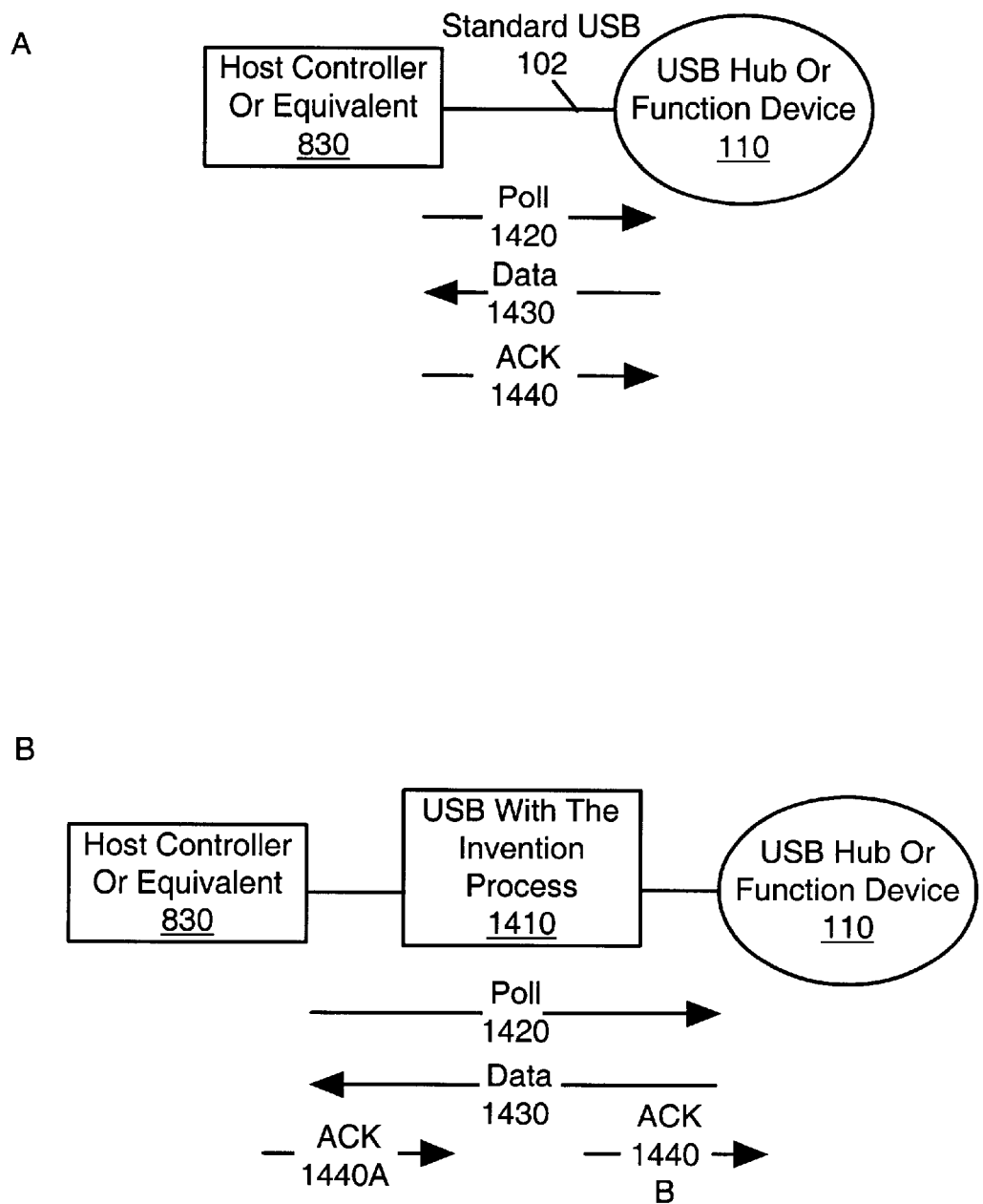
FIG. 14 illustrates the use of acknowledgements to avoid time-out limitations of USB.

FIG. 14: The Use Of Acknowledgements To Avoid Time-Out Limitations Of USB

In half-duplex timed response data transfer systems such as USB, typically a data source may launch a data packet and look for an acknowledgement of receipt of the data from the other end within a specified time interval. If this time interval is exceeded without the receipt of the acknowledgement then the transmitting unit may assume the transaction is a failure and initiate a repeat transmission of the same data. FIG. 14 illustrates a technique whereby acknowledgements may be used to prevent USB time-out errors related to long transmission distances. As 14A shows, in a standard USB communications system, after stimulation by polling 1420, a hub or function device 110 may send a data packet 1430 back to the host controller 830 or equivalent. This transmission to the host controller 830 may then stimulate a response back to the hub or function device 110 in the form of an acknowledgement 1440. The acknowledgement must typically occur within a specified and limited time, according to the USB specification. The ACK informs the hub or function device 110 that the transmission transaction was successful and that the hub or function device 110 may proceed with the next activity. This characteristic may be utilized by various embodiments of the system and method to circumvent time-out issues. Specifically, as shown in 14B, by sending an immediate ACK to the hub or function device 110, and waiting for the ACK from the host controller 830, the system may allow the hub or function device 110 to operate as if it has successfully transmitted its data packet to the host controller 830 even though the data packet may not actually have been received and qualified by the host controller 830. Additionally, in order to accommodate errors in the transmission process between the hub or function device 110 and the host controller 830, in one embodiment, the system may retain a copy of the data packet to assure retransmission of the data packet in such an event.

Figure 15:
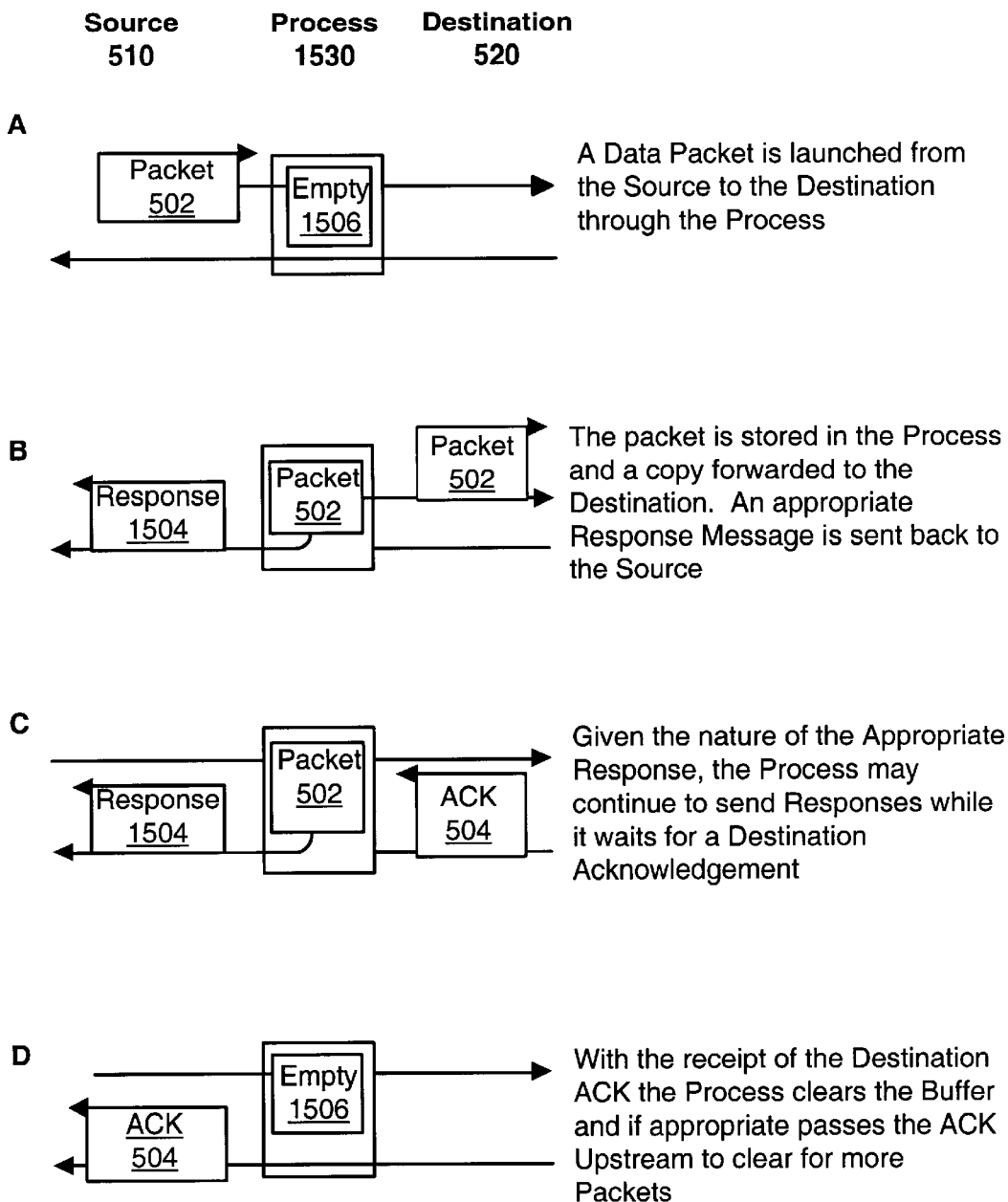
FIG. 15 illustrates the use of acknowledgements to avoid USB time-out limitations.

FIG. 15: The Use Of Acknowledgements To Avoid Time-Out Limitations Of USB

FIG. 15 illustrates an approach whereby transmissions between a USB source and a USB destination may be intercepted by a process 1530 and manipulated to avoid time-out limitations of standard USB, as described in the USB specification. As FIG. 15 shows in diagram A, source 510 may launch a data packet 502 to destination 530. Process 1530 may include a buffer which is shown by diagram A to be empty 1506. The Process 1530 may wait for an incoming packet of data from the source 510. In one embodiment, the source may be a hub or function device 110 in the USB network.

As may be seen in diagram B, the packet 502 may be stored in the process 1530 buffer, after which a copy of the packet may be forwarded to the destination 520. The process 1530 may then send a response message 1504 to the source 510, indicating that the packet 502 has been sent successfully. The response 1504 may be any message that prevents the source 510 from sensing an error state and refusing to send the next sequential packet, which is typically a specific acknowledge packet.

As diagram C shows, depending on the nature of the response message 1504, the process 1530 may continue to send responses while waiting for an ACK 504 from the destination 520. Once the destination 520 receives the data packet 502 the destination 520 may either issue an ACK if the reception was successful, or a request for retransmission if there was a receive problem. If the process 1530 receives the request for retransmission then the process 1530 may send the contents of the buffer again and wait for a response. If the destination 520 successfully receives the data packet 502, then an ACK may be issued.

Finally, as shown in diagram D of FIG. 15, upon receipt of the destination ACK 504, the process 1530 may clear the process buffer 1506 and, if appropriate, pass the ACK 504 upstream to the source 510 to clear for more packets, i.e., the system may be reset for the next data packet.

Figure 16:
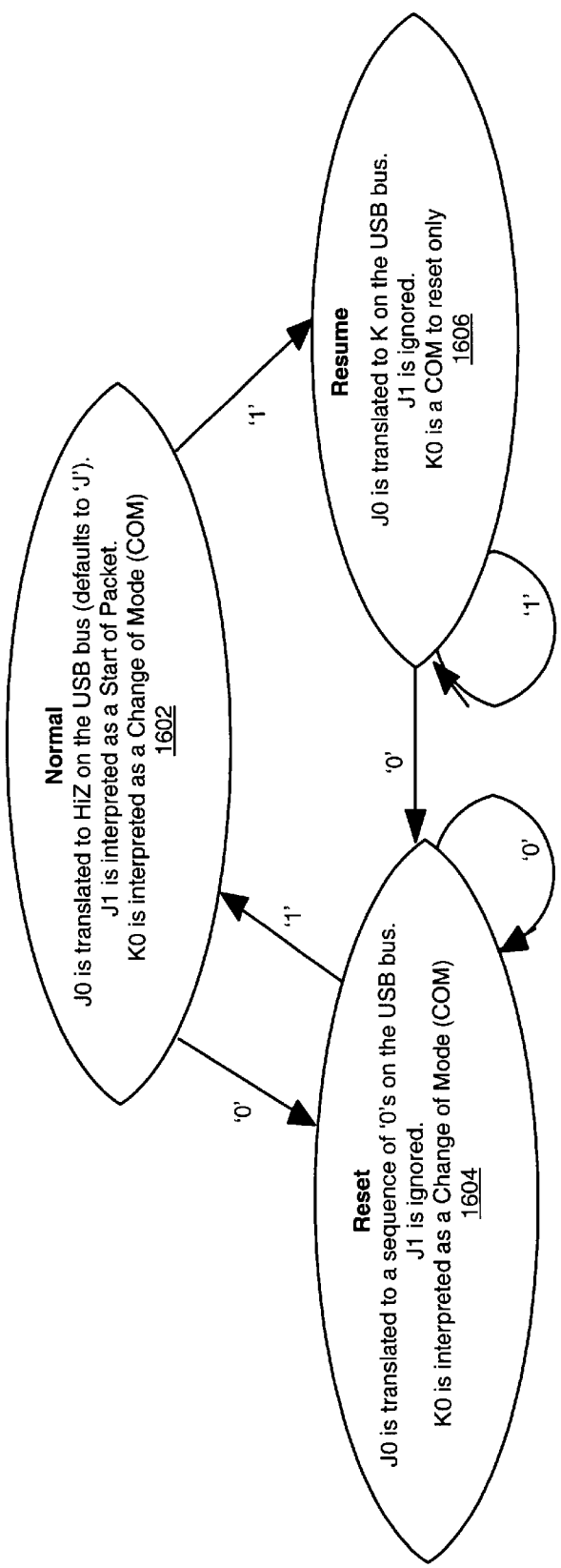
FIG. 16 illustrates USBX process control states and transitions.

FIG. 16: USBX Process Control States And Transitions

Standard USB operations include the transmission of J and K symbols. USB typically operates at one of two speeds: a low speed (1.5 mBit) wherein a J symbol is a low state and the K symbol is high state, and a high speed, wherein the states are inverted, that is a J symbol is the high state in the wire, and the K symbol is the low state.

The flow of these symbols generally manages four control states in the process as follows:

Reset—A sequence of "0"s for more than 10 milliseconds

Suspend—A sequence of "J" symbols for more than 3 milliseconds

Resume—A sequence of "K" symbols for more than 20 milliseconds

Operational—J (with an SOF (Start Of Frame) every 1 ms)

These commands may be translated into USBX as shown below. Note that bit values of "0" and "1" refer to low and high states, respectively. The USBX Operations include:

JØ—a string of 1,1,0,0 (two high bits, two low bits, which may form a single 12 mHz square wave segment)

J1—a string of 1,1,1, (four high bits in a row, which may form the high half of a 6 MHz square wave segment)

KØ—a string of 0,0,0,0 (four low bits in a row, which may form the low half of a 6 MHz square wave)

K1—a string of 0,0,1,1 (two low bits, two bits, which may form a single 12 MHz square wave segment)

In the Standard USB protocol, a USB packet is typically only a series of J1 and KØ symbols. The general USBX commands include:

Idle state—continuous JØ (continuous 12 MHz square wave)

Mark start of USB Packet—J1

Make State of Change Request—KØ

Never used so as to not be confused with JØ—K1

FIG. 16 illustrates the process control states and their respective transitions. The state engine that operates the remote root hub 230A may be switched between normal 1602, reset 1604, and resume 1606 modes in the following way. As FIG. 16 shows, if the state engine is in normal mode 1602, then J0 may be translated to HiZ on the USB bus and defaults to "J". HiZ denotes a high impedance state which stabilizes a line when no data are being transmitted, thus preventing spurious currents from flowing through the line. J1 may be interpreted as a start of packet (SOP). Finally, K0 may be interpreted as a change of mode (COM). As FIG. 16 shows, a control command of "0"may cause a transition from normal mode 1602 to reset mode 1604, while a control command of "1" may cause a transition from normal mode 1602 to resume mode 1606.

When the state engine is in resume mode 1606, J0 may be translated to K on the USB bus, J1 may be ignored, and K0 may be a COM to reset only. As FIG. 16 shows, a control command of "1" may retain the resume mode 1606, while a control command of "0" may cause a transition from normal mode 1602 to reset mode 1604.

When the state engine is in reset mode 1604, J0 may be translated to a sequence of "0"s on the USB bus, J1 may be ignored, and K0 may be interpreted as a change of mode (COM). A control command of "0" may retain the reset mode 1604, while a control command of "1" may cause a transition from resest mode 1604 to normal mode 1602.

The translation of USB symbols into USBX symbols may provide a mechanism for transferring USB data over the USBX bus, and may allow the time dependent constraints in USB to be transferred to the Remote Root Hub.

In the USB system the Remote Hub 230 may need to know which packets are sent to an from isochronous endpoints. Isochronous endpoints typically do not use acknowledgements at all, as they are generally streaming data such as video and it would be inappropriate for the root hub to issue and ACK to these devices. To accommodate this need, the SYNC field in USBX may be modified. In USB the SYNC field is typically 8 bits in length and may be used to lock the respective clocks for decoding the data stream. In USBX this SYNC field may be modified to include information as to whether the data are isochronous or needing an ACK. Isochronous data may be sent with a SYNC field including 4 low-high symbols. In one embodiment, alll other data may be sent with 3 pairs of low-high and a single low-low set. Thus, the USBX system may accommodate the transfer of both isochronous and non-isochronous data.

Figure 17:
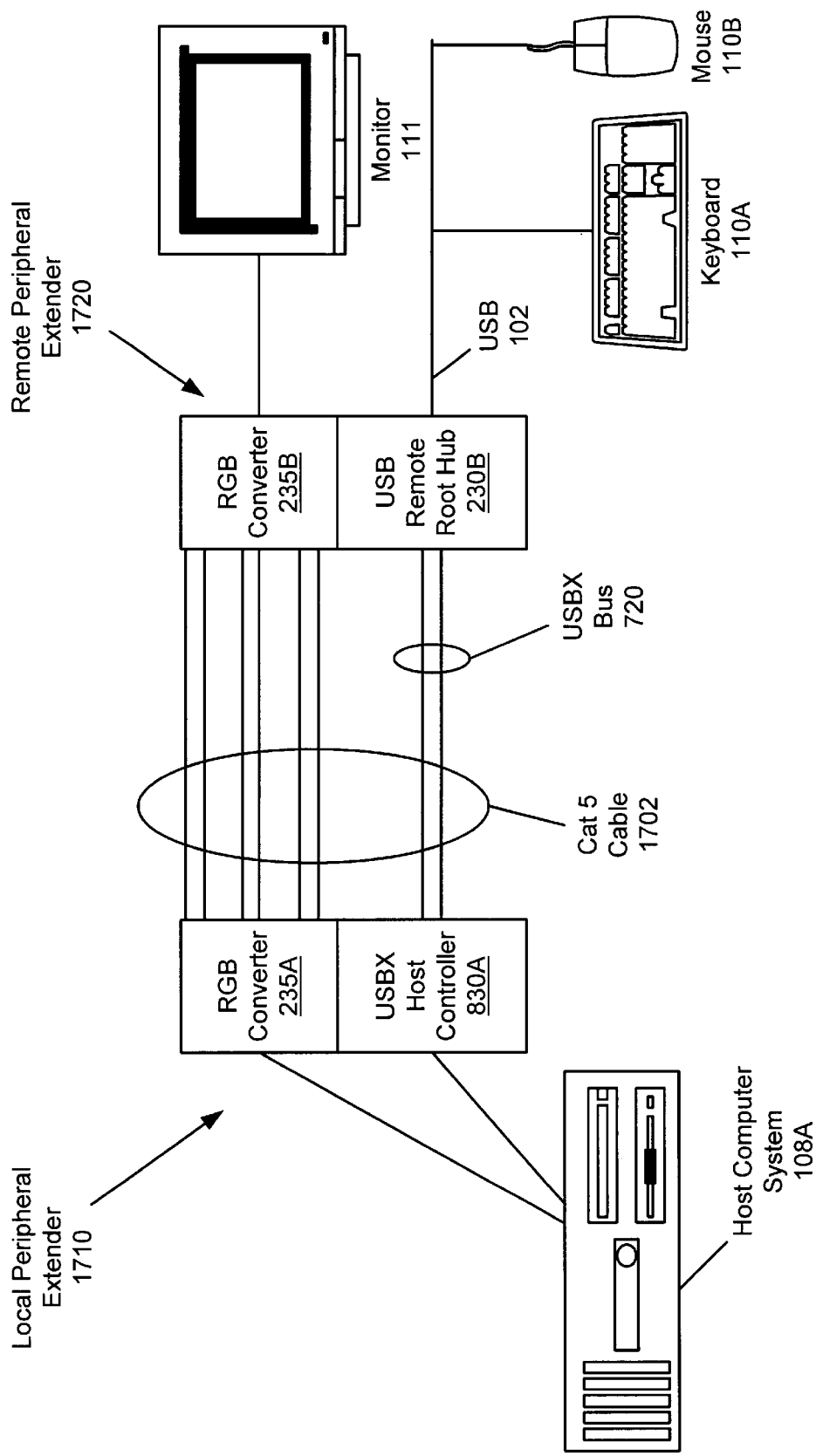
FIG. 17 illustrates a combination video/USBX system, according to one embodiment.

FIG. 17: A Combination Video/USBX System

FIG. 17 illustrates a system for operating a display device and one or more USB peripherals remotely from a host computer. As FIG. 17 shows, a host computer system 108A may be coupled to a local extender 1710 which may in turn be coupled to a remote extender 1720 through a plurality of twisted wire pairs 1702 which, in one embodiment, may comprise an extension bus. The remote extender 1720 may be coupled to a display device 111, such as monitor 111, and one or more USB peripherals, such as keyboard 110A and mouse 110B. The local extender 1710 may be operable to receive a video signal and one or more peripheral signals from the host computer system 108A and transmit the video and peripheral signals to the remote extender 1720, which may process and send the signals to the display device 111 and peripherals 110A and 110B.

In one embodiment, the local extender 1710 may be comprised in the host computer system. In one embodiment, the host computer system 108A may be comprised on a card or "blade" which is installed in a chassis, described in U.S. Pat. No. 6,012,101 by Heller, et al., titled "Computer Network Having Commonly Located Computing Systems" which is incorporated by reference above. In one embodiment, the local extender 1710 may simply be a component on the "blade". Similarly, in one embodiment the remote extender 1720 may be comprised in the display device 111, wherein the one or more peripherals 110 may be coupled to the remote extender 1720 via connections on the display device 111. In other embodiments the remote extender 1720 may be comprised on the keyboard 110A or any other peripheral device 110.

As may be seen in FIG. 17, the local extender 1710 may comprise a first video converter 235A and a local or host controller 830A which may be coupled to the host computer system 108A. The remote extender 1720 may comprise a second video converter 235B which may be coupled to the display device 111 and a remote peripheral controller 230B, also referred to as a USB interface device, which may be coupled to the one or more USB peripheral 110A and 110B. In one embodiment of the system which uses USB to communicate with the USB peripherals, the host (local) controller 830A may be a USBX host controller and the remote peripheral controller (USB interface device) 230B may be a USB Remote Root Hub 230B, as described above with reference to FIGS. 7–16.

In one embodiment, the plurality of twisted wire pairs 1702 may comprise a Category 5 cable 1702, in which three twisted wire pairs may be used to transmit video signals from the first video converter 235A to the second video converter 235B, and one twisted wire pair may be used to transmit peripheral data from the USBX host controller 830A to the USB remote root hub 230B, as shown in FIG. 17. Thus, the one twisted wire pair used to transmit peripheral data may comprise a non-USB compliant bus, such as a USBX bus, described above.

In one embodiment, the system described above may implement the remote user interface system described above with reference to FIG. 7, and which is described in U.S. Pat. No. 6,012,101 by Heller, et al., which is incorporated by reference above. In such a system one or more host computers may be installed in a centrally located rack mount system with the user interface hardware for each of the host computers located remotely.

In one embodiment, the video signals and the peripheral signals may be combined for transmittal over the extension bus. In one embodiment the combining of the video signals and the peripherals signals may include transmitting the video signals and the peripheral signals over separate sets of twisted wire pairs within the same cable. In another embodiment, the video signals and the peripheral signals may be combined in the same cable through the use of time division multiplexing or frequency division multiplexing.

Figure 18:
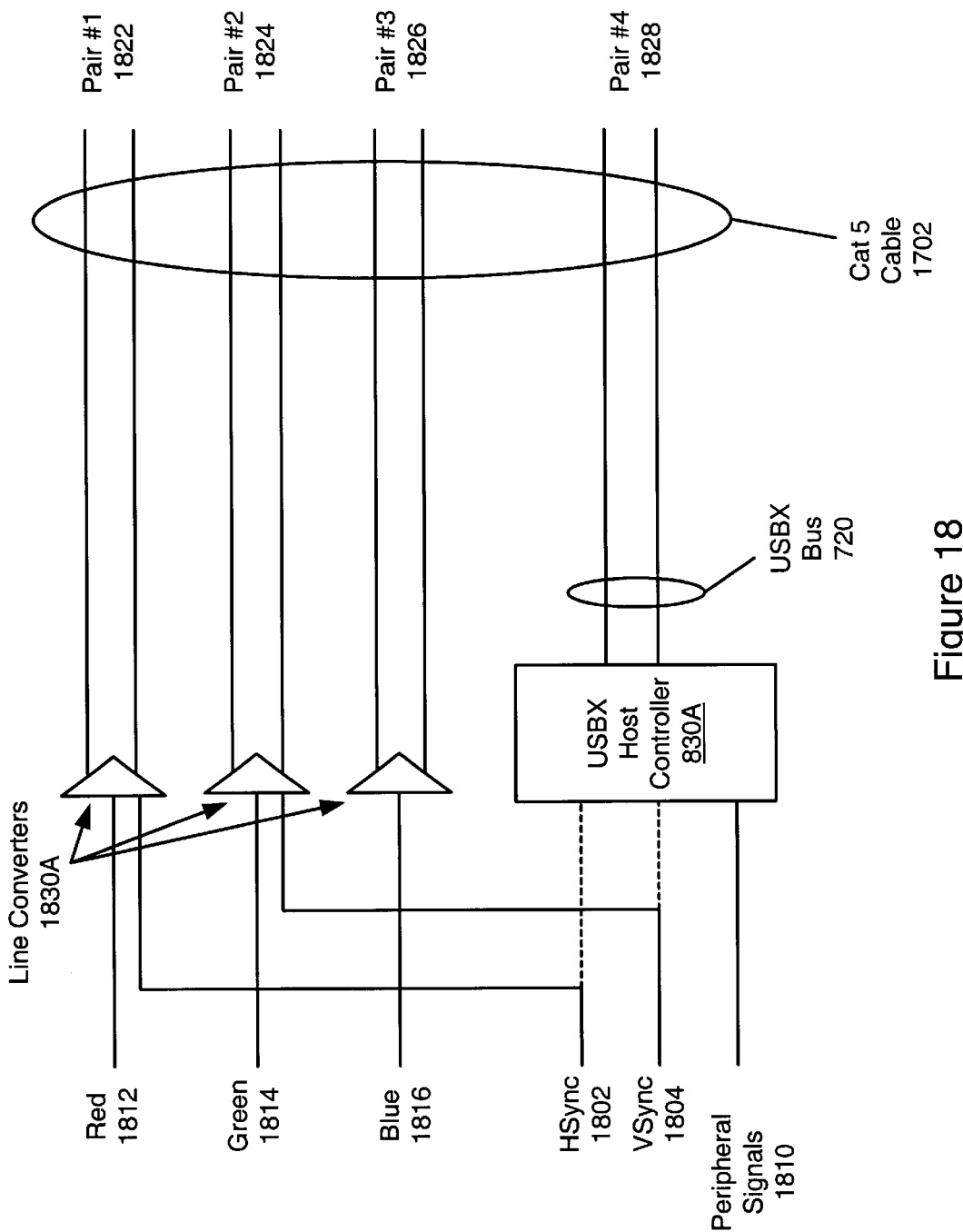
FIG. 18 illustrates a host-side process of the video/USBX system, according to one embodiment.

FIG. 18: A Host-Side Process of the System

FIG. 18 illustrates the local extender 1710 in greater detail. As FIG. 18 shows, the video signal received from the host computer 108A may include Red-Green-Blue (RGB) data comprising a Red component 1812, a Green component 1814, and a Blue component 1816, which may be transmitted over twisted wire pair #1 1822, twisted wire pair #2 1824, and twisted wire pair #3 1826, respectively. In one embodiment, line converters 1830A may convert the RGB video signals 1812, 1814, and 1816 from single ended video signals with a 0.7 volt maximum signal level and a 75 ohm termination to balanced signals operating at up to 1 volt and matching the impedance of the Category 5 cable 1702, e.g., 110 ohms.

As shown in FIG. 18, one or more peripheral signals 1810 may be received by USBX host controller 830A from the host computer system 108A through an internal computer bus, such as a Personal Computer Interface (PCI) bus. As described above with reference to FIG. 8, the USBX host controller 830A may not be solely a standard USB host controller, but may be operable to provide a standard USB interface, or API (Application Programming Interface) to the USB Driver 240 on the host computer system 108A, while also providing an interface to the USBX bus 720 (see also FIG. 9). Additionally, the USBX bus 720 may not be a standard USB bus, but may operate to allow the communication of USBX packets between the USBX host controller 830A and the USB Remote Root Hub 230B. The USBX bus 720 may not share the cabling distance limitations of the standard USB bus 102, as described in the USB specification, i.e., the USBX bus cable may be significantly longer than the 5 meter maximum allowed for USB bus cables as described in the USB specification. In one embodiment, the USBX bus cable length may exceed 10 meters. Similarly, in one embodiment, the twisted wire pairs used to transmit the video signals from the local extender to the remote extender may exceed 5 meters in length, or, in another embodiment, may exceed 10 meters in length.

In one embodiment, the video data received from the host computer 108A may include synchronization control signals such as horizontal synchronization signal 1802 and vertical synchronization signal 1804. In one embodiment, the synchronization control signals 1802 and 1804 may be transmitted on any two of the three twisted wire pairs used to transmit the RGB video signals as described in U.S. Pat. No. 5,926,172, titled "Video Data Transmission And Display System And Associated Methods For Encoding/Decoding Synchronization Information And Video Data" by Hanley, which is incorporated by reference above. In another embodiment, the synchronization control signals 1802 and 1804 may be received by the USBX host controller 830A and transmitted along with the USB peripheral signals 1810 over the USBX twisted wire pair #4 1828. The synchronization signals received from the host computer 108A are generally long pulses which may be converted to short pulses for transmission over the cable 1702. The short pulses may be converted back to normal length by the USB interface device 230B, described below.

Figure 19:
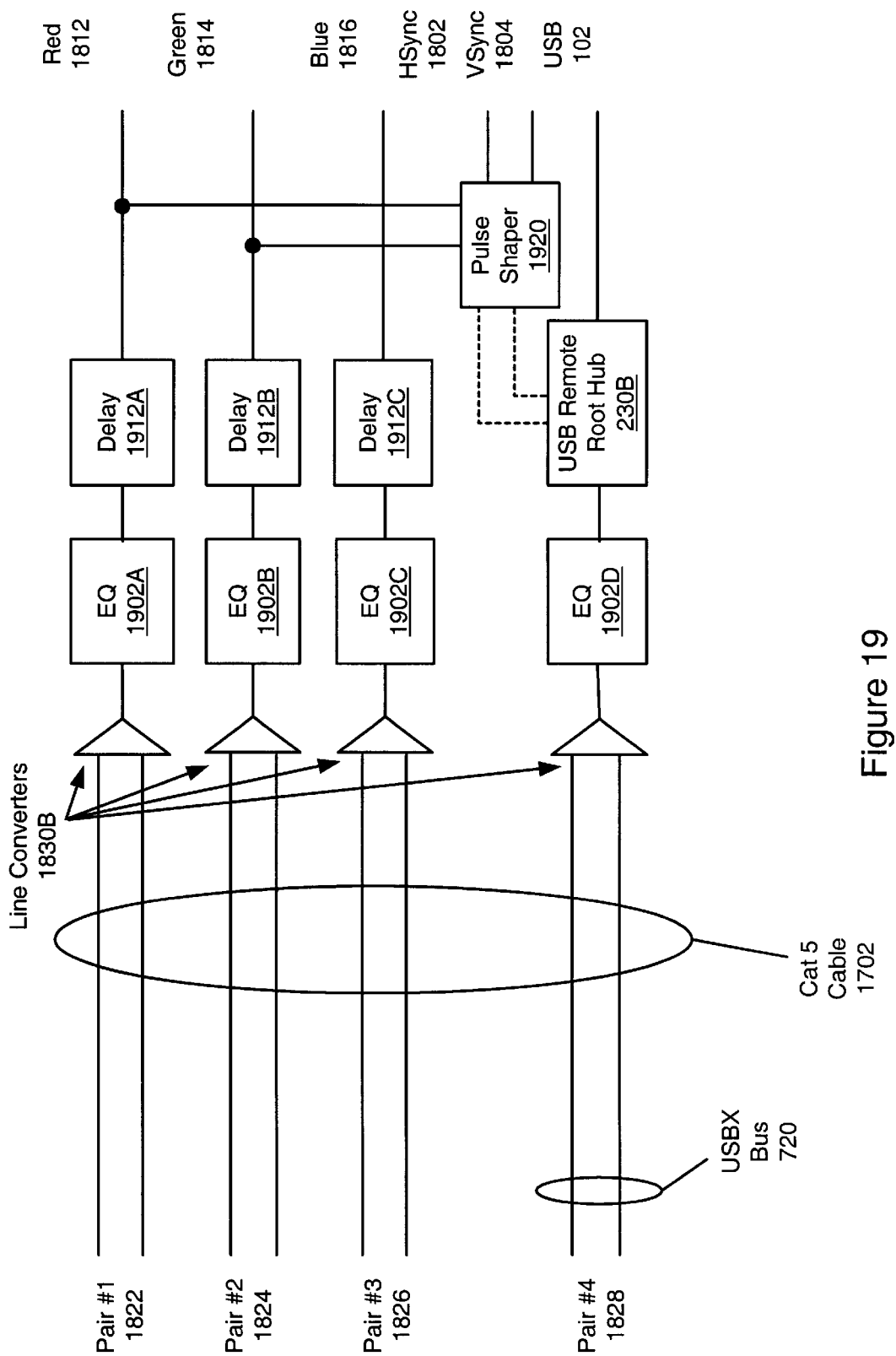
FIG. 19 illustrates a remote-side process of the video/USBX system, according to one embodiment.

FIG. 19: A Remote-Side Process of the System

FIG. 19 illustrates the remote extender 1720 in greater detail. As FIG. 19 shows, the twisted wire pairs 1822, 1824, and 1826 carrying the RGB video signals and the USB twisted wire pair 1828 may each couple to line converters 1830B which may in turn be coupled to equalization components 1902. The equalization components 1902 which process the RGB video signals 1812, 1814, and 1816 may be further coupled to delay components 1912. The delay components 1912 may be coupled to the display device 111, as shown in FIG. 17. The equalization component 1902D which receives the converted USB peripheral signals may be coupled to USB Remote Root Hub 230B, which may in turn be coupled to the one or more USB peripherals 110A and 110B, as shown in FIG. 17.

The line converters 1830B which receive the video and USBX peripheral signals from the category 5 cable may operate to convert the signals back from the balanced state to the single-ended state. The signals may then be processed by equalization components (EQ) 1902 which may be operable to compensate for high and low frequency attenuation of the transmitted signals due to the length of the cable 1702. The RGB signals may then be processed by delay components 1912 as indicated in FIG. 19. The delay components 1912 may operate to compensate for time-of-flight differences between the three twisted wire pairs used to transmit the RGB signals. The time-of-flight differences refer to differences in transmission times for the RGB signals and are due to the fact that each twisted wire pair may have a different serve, or twist rate, which may result in differences in absolute length between the twisted wire pairs. The delay components 1912 may then send the compensated RGB video signals to the display device 111 for display.

As mentioned above, the USBX bus twisted wire pair 1828 may couple to the USB Remote Root Hub 230B through EQ component 1902D. The USB Remote Root Hub 230B may not be solely a standard USB controller, but rather may include logic which may operate in extending the USB bus 102, as described above with reference to FIGS. 9–16. The Remote Root Hub 230B may operate to translate the USBX peripheral signals from USBX to USB packets which may then be sent to the USB peripherals 110 over USB 102.

As mentioned above with reference to FIG. 18, in one embodiment the horizontal synchronization signal 1802 and vertical synchronization signal 1804 may be transmitted on any two of the three twisted wire pairs used to transmit the RGB video signals, in which case the two twisted wire pairs which operate to transmit the synchronization control signals may be coupled to a pulse shaper 1920. The pulse shaper 1920 may be operable to reshape the signal pulses from the short-pulse format (used for transmission over the cable 1702) to a long-pulse format required by the display device 111 and to send the reshaped pulses to the display device 111.

In another embodiment also mentioned above with reference to FIG. 18, the synchronization control signals 1802 and 1804 may be received by the USBX host controller 830A and transmitted along with the USB peripheral signals 1810 over the USBX twisted wire pair #4 1828 to the USB Remote Root Hub 230B. The USB Remote Root Hub 230B may then be coupled to the pulse shaper 1920 which may operate to receive the synchronization control signals 1802 and 1804 and reshape the signal pulses to the long-pulse format required by the display device 111 and to send the reshaped pulses to the display device 111 as Hysnc 1802 and Vsync 1804 control signals.

Thus the local extender 1710 may receive video and USB peripheral signals from the host computer system 108A and convert the signals for transmittal over the category 5 cable 1702. The signals may then be transmitted over an extended distance through the category 5 cable 1702 to the remote extender 1720. The remote extender 1720 may then convert the signals back to RGB video and USB peripheral signals and send the signals to the display device 111 and the USB peripherals 110, respectively. The process and system described above may therefore provide for remote location of user interface hardware such as monitors, keyboards, and pointing devices from the host computer system 108A, while reducing cabling requirements from separate video and USB cables to a single thin category 5 cable which is a common and inexpensive component.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What it is claimed is:

1. A system, comprising:
    a host computer system including a processor and a memory, wherein the host computer system is located at a first location;
    a local extender coupled to the host computer system;
    a first bus which is coupled to the local extender, wherein the first bus comprises a first transmission medium and a second transmission medium;
    a remote extender which is coupled to the first bus, wherein the remote extender is further coupled to a Universal Serial Bus (USB);
    at least one USB device, wherein the at least one USB device is coupled to the USB, wherein the at least one USB device is located at a second location remote from the first location; and
    a display device coupled to the remote extender, wherein the display device is located at the second location;
    wherein the local extender and the remote extender comprise a split USB host controller;
    wherein the host computer system is operable to:
        transmit first peripheral signals intended for the at least one USB device and video signals intended for the display device to the local extender, wherein the video signals include HSync and VSync video synchronization signals; and wherein the local extender is operable to:
  convert the video signals to a format suitable for transmission over the first but to the remote extender;
  convert the first peripheral signals to first non-USB compliant peripheral signals for transmission over the first bus to the remote extender;
  transmit the converted video signals to the remote extender over the first transmission medium of the first bus; and
  transmit the first non-USB compliant peripheral signals to the remote extender over the second transmission medium of the first bus;

wherein the remote extender is operable to:
  convert the first non-USB compliant peripheral signals to first USB peripheral signals;
  convert the converted video signals back to the video signals, including the HSync and VSync video synchronization signals;
  transmit the first USB peripheral signals to the at least one USB device; and
  transmit the video signals to the display device for display;

wherein the remote extender is further operable to:
  receive second USB peripheral signals from the at least one USB device;
  convert the second USB peripheral signals to second non-USB compliant peripheral signals for transmission over the first bus to the local extender;
  transmit the second non-USB compliant peripheral signals to the local extender over the first bus; and wherein the local extender is further operable to:
  convert the second non-USB compliant peripheral signals to second peripheral signal; and
  transmit the second peripheral signals to the host computer.

2. The system of claim 1, wherein the local extender comprises:
  a USBX host controller; and
  a first video converter;
  wherein in the local extender being operable to convert the first peripheral signals to first non-USB compliant peripheral signals for transmission over the first bus to the remote extender, the USBX host controller is operable to convert the first peripheral signals to first USBX peripheral signals; and
  wherein in the local extender being operable to convert the video signals to a form which is suitable for transmission over the first bus, the first video converter is operable to convert the video signals to a form which is suitable for transmission over the first bus.

3. The system of claim 2, wherein the local extender being operable to convert the second non-USB compliant peripheral signals to the second peripheral signals, the USBX host controller is operable to convert second USBX peripheral signals to the second peripheral signals.

4. The system of claim 1, wherein the remote extender comprises:
  a USB remote root hub; and
  a second video converter;
  wherein in the remote extender being operable to convert the first non-USB compliant peripheral signals to the first USB peripheral signals, the USB remote root hub is operable to convert first USBX peripheral signals to the first USB peripheral signals; and
  wherein in the remote extender being operable to convert the converted video signals back to the first video signals, the second video converter is operable to convert the converted video signals back to the video signals.

5. The system of claim 4, wherein the remote extender being operable to convert the second USB peripheral signals to the second non-USB compliant peripheral signals for transmission over the first bus to the local extender, the USB remote root hub is operable to convert the first USB peripheral signals to second USBX peripheral signals for transmission over the first bus to the local extender.

6. The system of claim 1,
  wherein the first bus comprises four twisted wire pairs.

7. The system of claim 6, wherein the first transmission medium comprises three twisted wire pairs, wherein the converted video signals comprise converted Red, Green, and Blue video signals, wherein the three twisted wire pairs are operable to communicate the converted Red, Green, and Blue video signals, respectively, between the local extender and the remote extender, and wherein the remote extender is operable to convert the converted Red, Green, and Blue video signals to Red, Green, and Blue video signals, and send the Red, Green, and Blue video signals to the display device.

8. The system of claim 7, wherein the remote extender further comprises three delay components operable to couple to the three twisted wire pairs, wherein the three delay components are operable to synchronize the Red, Green, and Blue video signals to compensate for different time-of-flight values for each of the three twisted wire pairs.

9. The system of claim 7,
  wherein two of the three twisted wire pairs are further operable to communicate the HSync and VSync video synchronization signals between the local extender and the remote extender, and wherein the remote extender is operable to send the HSync and VSync video synchronization signals to the display device.

10. The system of claim 9, wherein the HSync and VSync video synchronization signals comprise pulses which are converted from standard length pulses to short pulses by the local extender for transmission over the two twisted wire pairs, wherein the remote extender further comprises a pulse shaper operable to couple to the two twisted wire pairs, wherein the pulse shaper is further operable to convert the short pulses back to standard length pulses for use by the display device.

11. The system of claim 6, wherein the second transmission medium comprises one twisted wire pair, wherein the one twisted wire pair is operable to communicate peripheral data between the local extender and the remote extender, and wherein the remote extender is operable to send the peripheral data to the one or more peripherals.

12. The system of claim 6, wherein the first bus comprises four twisted wire pairs, and wherein the remote extender further comprises four equalization components operable to couple to the four twisted wire pairs, wherein the four equalization components are operable to compensate for attenuation of low (DC) and high frequency signals due to the length of the four twisted wire pairs.

13. The system of claim 1, wherein the distance between the first location and the second location is greater than 5 meters.

14. The system of claim 1, wherein the distance between the first location and the second location is greater than 10 meters.

15. The system of claim 1, wherein the peripheral signals comprise PCI peripheral signals.

16. The system of claim 1, wherein the host computer system comprises a blade computer.

17. The system of claim 1, wherein the first and second non-USB compliant peripheral signals comprise USBX signals in accordance with a USBX protocol.

18. The system of claim 17, wherein the USBX protocol comprises one or more of the following operations:

JØ—a string of 1,1,0,0 (two high bits, two low bits, comprising a first single 12 mHz square wave segment);

J1—a string of 1,1,1,1 (four high bits in a row, comprising the high half of a 6 MHz square wave segment);

KØ—a string of 0,0,0,0 (four low bits in a row, comprising the low half of a 6 MHz square wave); and K1—a string of 0,0,1,1 (two low bits, two high bits, comprising a second single 12 MHz square wave segment).

19. The system of claim 18, wherein the USBX protocol comprises one or more of the following commands:

Idle state, signified by a continuous JØ (continuous 12 MHz square wave);

Mark start of USB Packet, signified by J1; and

Make State of Change Request, signified by KØ.

20. A method for operating a display device and one or more Universal Serial Bus (USB) peripheral remotely from a host computer; the method comprising:

the host computer system generating a video signal intended for the display device, wherein the host computer system is located at a first location, and wherein the video signal includes HSync and VSync video synchronization signals;

the host computer system generating one or more first peripheral signals intended for the one or more USB peripherals;

a local extender receiving the video signal and the one or more first peripheral signals;

the local extender converting the one or more first peripheral signals to the first non-USB compliant peripheral signals;

the local extender converting the video signals to a format suitable for transmission to a remote location;

the local extender transmitting the converted video signal and the one or more first non-USB compliant peripheral signals over a first bus to a remote extender, wherein the first bus comprises a first transmission medium and a second transmission medium, wherein the converted video signal is transmitted over the first transmission medium, and wherein the one or more first non-USB compliant peripheral signals are transmitted over the second transmission medium;

the remote extender receiving the converted video signal and the one or more first non-USB compliant peripheral signals from the local extender;

the remote extender converting the one or more first non-USB compliant peripheral signals to one or more USB peripheral signals for provision to the one or more USB devices;

the remote extender converting the converted video signals back to the video signals for provision to the display device, including the HSync and VSync video synchronization signals;

the remote extender providing the video signals to the display device; and the remote extender providing the one or more USB peripheral signals to the one or more USB peripherals, wherein the one or more USB devices are located at a second location remote from the first location;

wherein the local extender and the remote extender comprise a split USB host controller.

21. The method of claim 20, wherein the local extender receiving the video signal and the one or more peripheral signals comprise a first video converter receiving the video signal and a USBX host controller receiving the one or more peripheral signals.

22. The method of claim 21, wherein the first transmission medium of the first bus comprising three twisted wire pairs, and wherein the second transmission medium of the first bus comprises a fourth twisted wire pair;

wherein the local extender converting the video signals to a format suitable for transmission to a remote location comprises the first video converter converting the video signals to the format suitable for transmission to the remote location; and wherein the local extender transmitting the converted video signal over the first bus to the remote extender comprises the first video converter transmitting the converted video signal to a second video converter comprised in the remote extender over the three twisted wire pairs; and wherein the local extender transmitting the one or more first non-USB compliant peripheral signals over the first bus to the remote extender comprises the USBX host controller transmitting the one or more peripheral signals in the non-USB compliant form to a USB interface device over the fourth twisted wire pair.

23. The method of claim 22, wherein the USB interface device is a remote root hub.

24. The method of claim 22, wherein the converted video signal comprises converted Red, Green, and Blue (RGB) video signals, and wherein the converted Red video signal is transmitted over a first of the three twisted wire pairs, the converted Green video signal is transmitted over a second of the three twisted wire pairs, and the converted Blue video signal is transmitted over a third of the three twisted wire pairs.

25. The method of claim 24, wherein the converted video signals comprise the HSync and VSync video synchronization signals, wherein the HSync and VSync video synchronization signals are transmitted over two of the three twisted wire pairs.

26. The method of claim 21, wherein the first non-USB compliant peripheral signals are transmitted in accordance with a USBX protocol, wherein the USBX protocol comprises one or more of the following operations:

JØ—a string of 1,1,0.0 (two high bits, two low bits, comprising a first single 12 mHz square wave segment);

J1—a string of 1,1,1,1 (four high bits in a row, comprising the high half of a 6 MHz square wave segment);

KØ—a string of 0,0,0,0 (four low bits in a row, comprising the low half of a 6 MHz square wave); and K1—a string of 0,0,1,1 (two low bits, two high bits, comprising a second single 12 MHz square wave strength).

27. The system of claim 26, wherein the USBX protocol comprises one or more of the following commands:

Idle state, signified by a continuous JØ (continuous 12 MHz square wave);
Mark start of USB Packet, signified by J1; and
Make State of Change Request, signified by KØ.

28. The method of claim 20,
wherein the remote extender receiving the converted video signal comprises a second video converter receiving the converted video signals;
wherein the remote extender converting the converted video signals back to the video signals for provision to the display device comprises the second video converter converting the converted video signals back to the video signals for provision to the display device; and
wherein the remote extender providing the video signals to the display device comprises the second video converter providing the video signals to the display device.

29. The method of claim 20,
wherein the remote extender receiving the one or more first non-USB compliant peripheral signals from the local extender comprises a USB interface device receiving the one or more first non-USB compliant peripheral signals from the local extender;
wherein the remote extender converting the one or more first non-USB compliant peripheral signals to the one or more USB peripheral signals comprises the USB interface device converting the one or more first non-USB compliant peripheral signals back to the one or more USB peripheral signals; and
wherein the remote extender providing the one or more USB peripheral signals to the one or more USB peripherals comprises the USB interface device providing the one or more USB peripheral signals to the one or more USB peripherals.

30. The method of claim 20, wherein the distance between the first location and the second location is greater than 5 meters.

31. The method of claim 20, wherein the distance between the first location and the second location is greater than 10 meters.

32. The method of claim 20, wherein the distance between the first location and the second location is greater than that allowed by the USB specification.

33. The method of claim 20, wherein the peripheral signals comprise PCI signals.

34. A system, comprising:
a host computer system including a processor and a memory, wherein the host computer system is located at a first location;
a local extender coupled to the host computer system;
a first bus which is coupled to the local extender;
a remote extender which is coupled to the first bus, wherein the remote extender is further coupled to a Universal Serial Bus (USB);
wherein the local extender and the remote extender comprise a split USB host controller;
at least one USB device, wherein the at least one USB device is coupled to the USB, wherein the at least one USB device is located at a second location remote from the first location; and
a display device coupled to the remote extender, wherein the display device is located at the second location;
wherein the host computer system is operable to:
transmit first peripheral signals intended for the at least one USB device and video signals intended for the display device to the local extender; and
wherein the local extender is operable to:
convert the video signals to a format suitable for transmission over the first bus to the remote extender;
convert the first peripheral signals to first USBX peripheral signals for transmission over the first bus to the remote extender; and
transmit the converted video signals and the first USBX peripheral signals to the remote extender over the first bus;
wherein the remote extender is operable to:
convert the first USBX peripheral signals to first USB peripheral signals;
convert the converted video signals back to the video signals;
transmit the first USB peripheral signals to the at least one USB device; and
transmit the video signals to the display device for display;
wherein the remote extender is further operable to:
receive second USB peripheral signals from the at least one USB device;
convert the second USB peripheral signals to second USBX peripheral signals for transmission over the first bus to the local extender;
transmit the second USBX peripheral signals to the local extender over the first bus; and
wherein the local extender is further operable to:
convert the second USBX peripheral signals to second peripheral signals; and
transmit the second peripheral signals to the host computer; and
wherein the USBX peripheral signals are transmitted in accordance with a USBX protocol, wherein the USBX protocol comprises one or more of the following operations:
JØ—a string of 1,1,0,0 (two high bits, two low bits, comprising a first single 12 mHz square wave strength);
J1—a string of 1,1,1,1 (four high bits in a row, comprising the high half of a 6 MHz square wave segment);
KØ—a string of 0,0,0,0 (four low bits in a row, comprising the low half of a 6 MHz square wave); and
K1—a string of 0,0,1,1 (two low bits, two high bits, comprising a second single 12 MHz square wave segment).

35. The system of claim 34, wherein the USBX protocol comprises one or more of the following commands:
Idle state, signified by a continuous JØ (continuous 12 MHz square wave);
Mark start of USB Packet, signified by J1; and
Make State of Change Request, signified by KØ.

36. A system, comprising:
a host computer system including a processor and a memory, wherein the host computer system is located at a first location;
a local extender coupled to the host computer system;
a first bus which is coupled to the local extender;
a remote extender which is coupled to the first bus, wherein the remote extender is further coupled to a Universal Serial Bus (USB);
at least one USB device, wherein the at least one USB device is coupled to the USB, wherein the at lest one USB device is located at a second location remote from the first location, wherein the second location is more than approximately 10 meters from the first location; and a display device coupled to the remote extender, wherein the display device is located at the second location;

wherein the local extender and the remote extender comprise a split USB host controller;

wherein the host computer system is operable to:
  transmit first peripheral signals intended for the at least one USB device and video signals intended for the display device to the local extender; and wherein the local extender is operable to:
  convert the video signals to a format suitable for transmission over the first bus to the remote extender;
  convert the first peripheral signals to first non-USB compliant peripheral signals for transmission over the first bus to the remote extender;
  transmit the converted video signals and the first non-USB compliant peripheral signals to the remote extender over the first bus; and wherein the remote extender is operable to:
  convert the first non-USB compliant peripheral signals to first USB peripheral signals;
  convert the converted video signals back to the video signals;
  transmit the first USB peripheral signals to the at least one USB device; and
  transmit the video signals to the display device for display;

wherein the remote extender is further operable to:
  receive second USB peripheral signals from the at least one USB device;
  convert the second USB peripheral signals to second non-USB compliant peripheral signals for transmission over the first bus to the local extender;
  transmit the second non-USB compliant peripheral signals to the local extender over the first bus; and wherein the local extender is further operable to:
  convert the second non-USB compliant peripheral signals to second peripheral signals; and
  transmit the second peripheral signals to the host computer.

37. The system of claim 36, wherein the first bus comprises a first transmission medium and a second transmission medium, and wherein, in transmitting the converted video signals and the first non-USB compliant peripheral signals to the remote extender over the first bus, the local extender is operable to:
  transmit the converted video signals to the remote extender over the first transmission medium of the first bus; and
  transmit the first non-USB compliant peripheral signals to the remote extender over the second transmission medium of the first bus.

38. The system of claim 36, wherein the first bus comprises a first transmission medium and a second transmission medium, and wherein, in transmitting the converted video signals and the first non-USB compliant peripheral signals to the remote extender over the first bus, the local extender is operable to:
  transmit converted Red, Green, and Blue video signals to the remote extender over the first transmission medium of the first bus; and
  transmit the first non-USB compliant peripheral signals and HSync and VSync video synchronization signals to the remote extender over the second transmission medium of the first bus.

39. The system of claim 38,
wherein the first bus comprises four twisted wire pairs;
wherein the first transmission medium comprises three twisted wire pairs, and wherein the second transmission medium comprises a fourth twisted wire pair; and
wherein the fourth twisted wire pair is operable to communicate the first non-USB compliant peripheral signals and the HSync and VSync video synchronization signals between the local extender and the remote extender, and wherein the remote extender is operable to send the HSync and VSync video synchronization signals to the display device.

40. The system of claim 39,
wherein the remote extender comprises a first video converter and a remote root hub; and
wherein the remote extender is operable to couple to a pulse shaper, wherein the remote root hub is operable to receive the HSync and VSync video synchronization signals from the local extender, wherein the HSync and VSync video synchronization signals comprise pulses which are converted from standard length pulses to short pulses by the local extender for transmission over the one twisted wire pair, and wherein the pulse shaper is operable to receive the HSync and VSync video synchronization signals from the remote root hub, convert the short pulses back to standard length pulses for use by the display device, and send the converted signals to the display device.

41. The method of claim 39, further comprising:
  the local extender transmitting the HSync and VSync video synchronization signals to the remote extender over the fourth twisted wire pair and sending the HSync and VSync video synchronization signals to the display device.

42. The system of claim 36, wherein the video signals and the USB peripheral signals are combined on the first bus.

43. The system of claim 42, wherein the video signals and the peripheral signals are combined via one of time division multiplexing or frequency division multiplexing.

* * * * *

UNITED STATES PATENT AND TRADEMARK OFFICE
CERTIFICATE OF CORRECTION

PATENT NO. : 6,735,658 B1  
DATED : May 11, 2004  
INVENTOR(S) : Thornton

It is certified that error appears in the above-identified patent and that said Letters Patent is hereby corrected as shown below:

Column 22,  
Line 55, please delete "JØ – a string of 1,1,0.0 (two high bits, two low bits," and substitute -- JØ – a string of 1,1,0,0 (two high bits, two low bits, --.

Column 24,  
Line 66, please delete "device is coupled to the USB, wherein the at lest one" and substitute -- device is coupled to the USB, wherein the at least one --.

Signed and Sealed this

Eighteenth Day of January, 2005

JON W. DUDAS  
*Director of the United States Patent and Trademark Office*